US012194731B2

(12) United States Patent
Harada et al.

(10) Patent No.: US 12,194,731 B2
(45) Date of Patent: Jan. 14, 2025

(54) MEDIUM DRYING DEVICE, MEDIUM PROCESSING APPARATUS, AND RECORDING SYSTEM

(71) Applicant: SEIKO EPSON CORPORATION, Tokyo (JP)

(72) Inventors: Yutaro Harada, Shiojiri (JP); Kohei Ueno, Matsumoto (JP); Nobuyuki Mizushima, Shiojiri (JP); Shunpei Yamaguchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/318,156

(22) Filed: May 16, 2023

(65) Prior Publication Data

US 2023/0278349 A1 Sep. 7, 2023

Related U.S. Application Data

(63) Continuation of application No. 17/477,173, filed on Sep. 16, 2021, now Pat. No. 11,691,440, which is a continuation of application No. 16/719,102, filed on Dec. 18, 2019, now Pat. No. 11,148,438.

(30) Foreign Application Priority Data

Dec. 21, 2018 (JP) ................................. 2018240120

(51) Int. Cl.

| | |
|---|---|
| ***B41J 11/00*** | (2006.01) |
| ***B65H 29/60*** | (2006.01) |
| ***B65H 37/04*** | (2006.01) |
| ***B65H 85/00*** | (2006.01) |

(Continued)

(52) U.S. Cl.

CPC .......... *B41J 11/0024* (2021.01); *B41J 11/002* (2013.01); *B41J 11/00242* (2021.01); *B65H 29/60* (2013.01); *B65H 37/04* (2013.01); *B65H 85/00* (2013.01); *B41J 13/0036* (2013.01);

(Continued)

(58) Field of Classification Search

CPC . B41J 11/0024; B41J 11/002; B41J 11/00242; B41J 13/0036; B65H 29/60; B65H 37/04; B65H 85/00; B65H 2405/11152; G03G 15/2021; G03G 15/2039

See application file for complete search history.

(56) References Cited

U.S. PATENT DOCUMENTS

| | | | |
|---|---|---|---|
| 5,757,407 | A | 5/1998 | Rezanka |
| 7,419,255 | B2 | 9/2008 | Kawaguchi et al. |
| 10,272,698 | B2 | 4/2019 | Kodama et al. |

(Continued)

FOREIGN PATENT DOCUMENTS

| | | |
|---|---|---|
| DE | 10-2016-200652 | 8/2016 |
| EP | 1536057 | 6/2005 |

(Continued)

*Primary Examiner* — Yaovi M Ameh

(74) *Attorney, Agent, or Firm* — WORKMAN NYDEGGER

(57) ABSTRACT

A medium drying device includes a transport roller pair as a transport unit that transports a medium and a heat roller pair as one heating unit that heats the medium transported by the transport roller pair and is provided in a transport direction of the medium, in which the medium is configured to be transported to a heating area by the heat roller pair a plurality of times.

20 Claims, 18 Drawing Sheets

(51) Int. Cl.
*B41J 13/00* (2006.01)
*G03G 15/20* (2006.01)

(52) U.S. Cl.
CPC .............. *B65H 2405/11152* (2013.01); *G03G 15/2021* (2013.01); *G03G 15/2039* (2013.01)

(56) References Cited

U.S. PATENT DOCUMENTS

| | | | | |
|---|---|---|---|---|
| 10,787,005 | B2 | 9/2020 | Harada et al. | |
| 11,235,594 | B2 | 2/2022 | Harada et al. | |
| 11,633,964 | B2 | 4/2023 | Harada et al. | |
| 2003/0007061 | A1 | 1/2003 | Ogawa | |
| 2005/0117009 | A1 | 6/2005 | Kawaguchi et al. | |
| 2005/0220477 | A1* | 10/2005 | Nakane | G03G 21/206 399/92 |
| 2005/0220505 | A1* | 10/2005 | Hashimoto | G03G 15/2021 399/328 |
| 2008/0213017 | A1* | 9/2008 | Morisawa | B65H 31/02 399/405 |
| 2011/0267393 | A1 | 11/2011 | Okamoto | |
| 2011/0267396 | A1 | 11/2011 | Yamamoto | |
| 2012/0249704 | A1 | 10/2012 | Kato et al. | |
| 2014/0125982 | A1* | 5/2014 | Takemura | G01J 3/52 356/421 |
| 2015/0251474 | A1 | 9/2015 | Ooba | |
| 2016/0370744 | A1 | 12/2016 | Kataoka et al. | |
| 2017/0173973 | A1 | 6/2017 | Tsutsui | |
| 2018/0015738 | A1 | 1/2018 | Kodama et al. | |
| 2019/0176491 | A1* | 6/2019 | Rasmussen | B41J 11/0024 |
| 2019/0283462 | A1* | 9/2019 | Oura | B41J 13/009 |
| 2019/0337309 | A1 | 11/2019 | Harada et al. | |
| 2020/0376858 | A1 | 12/2020 | Harada et al. | |
| 2021/0309023 | A1* | 10/2021 | Kimata | B41J 11/00222 |
| 2022/0105734 | A1 | 4/2022 | Harada et al. | |

FOREIGN PATENT DOCUMENTS

| | | | | |
|---|---|---|---|---|
| JP | 09-076556 | | 3/1997 | |
| JP | 2003-048348 | | 2/2003 | |
| JP | 2003-151722 | A | 5/2003 | |
| JP | 2005-187214 | | 7/2005 | |
| JP | 2008-179012 | | 8/2008 | |
| JP | 2008179012 | A * | 8/2008 | B41J 2/01 |
| JP | 2012-210758 | | 11/2012 | |
| JP | 2014-233879 | A | 12/2014 | |
| JP | 2015-054746 | | 3/2015 | |
| JP | 2018-008779 | A | 1/2018 | |
| WO | 2015-037666 | | 3/2015 | |
| WO | 2018-044324 | | 3/2018 | |

* cited by examiner

MEDIUM DRYING DEVICE, MEDIUM PROCESSING APPARATUS, AND RECORDING SYSTEM

This application is a continuation of U.S. patent application Ser. No. 17/477,173, filed Sep. 16, 2021, which is a continuation of U.S. patent application Ser. No. 16/719,102, filed Dec. 18, 2019, which claims priority to JP Application No. 2018-240120, filed Dec. 21, 2018, the disclosures of which are hereby incorporated by reference herein in their entirety.

BACKGROUND

1. Technical Field

The present disclosure relates to a medium drying device that dries a medium, a medium processing apparatus including the medium drying device, and a recording system including the medium drying device.

2. Related Art

In a medium processing apparatus that performs processing, such as stapling processing and punching processing, on a medium, for example, transported mediums are sent to a loading tray and ends of the mediums are aligned with each other in the loading tray. Thereafter, the processing such as the stapling processing and the punching processing is performed. Further, such a medium processing apparatus may be provided adjacent to a recording apparatus represented by a printer and may constitute a recording system as a whole.

In the above-described recording system, when the recording apparatus is an ink jet printer that performs recording by ejecting ink to a medium, an unique problem occurs. That is, in the medium on which the recording is performed by ejecting the ink, since friction of an ink ejection surface becomes high, there is a problem in that when the medium processing apparatus performs the processing, the integrity of the medium in the loading tray deteriorates. Then, in order to cope with the problem, a drying device that dries the medium before the medium is sent to the loading tray may be provided.

A drying device including a drying roller pair that heats a medium while holding the medium is disclosed in JP-A-2012-210758.

When the medium is dried by applying heat to the medium from the outside with a heating unit such as a drying roller pair, a liquid component near the surface of the medium is evaporated. However, the liquid component remains near the center of the medium in a thickness direction, and the medium may not be sufficiently dried.

For example, when a plurality of heating units are arranged side by side in a medium transport direction, the medium can be further dried. However, manufacturing costs of the device may increase, and the size of the device may increase.

SUMMARY

A medium drying device according to the present disclosure for solving the above-described problems includes a transport unit that transports a medium, and one heating unit that heats the medium transported by the transport unit and is provided in a transport direction of the medium, in which the medium is transported to a heating area by the heating unit a plurality of times.

DESCRIPTION OF EXEMPLARY EMBODIMENTS

Figure 1:
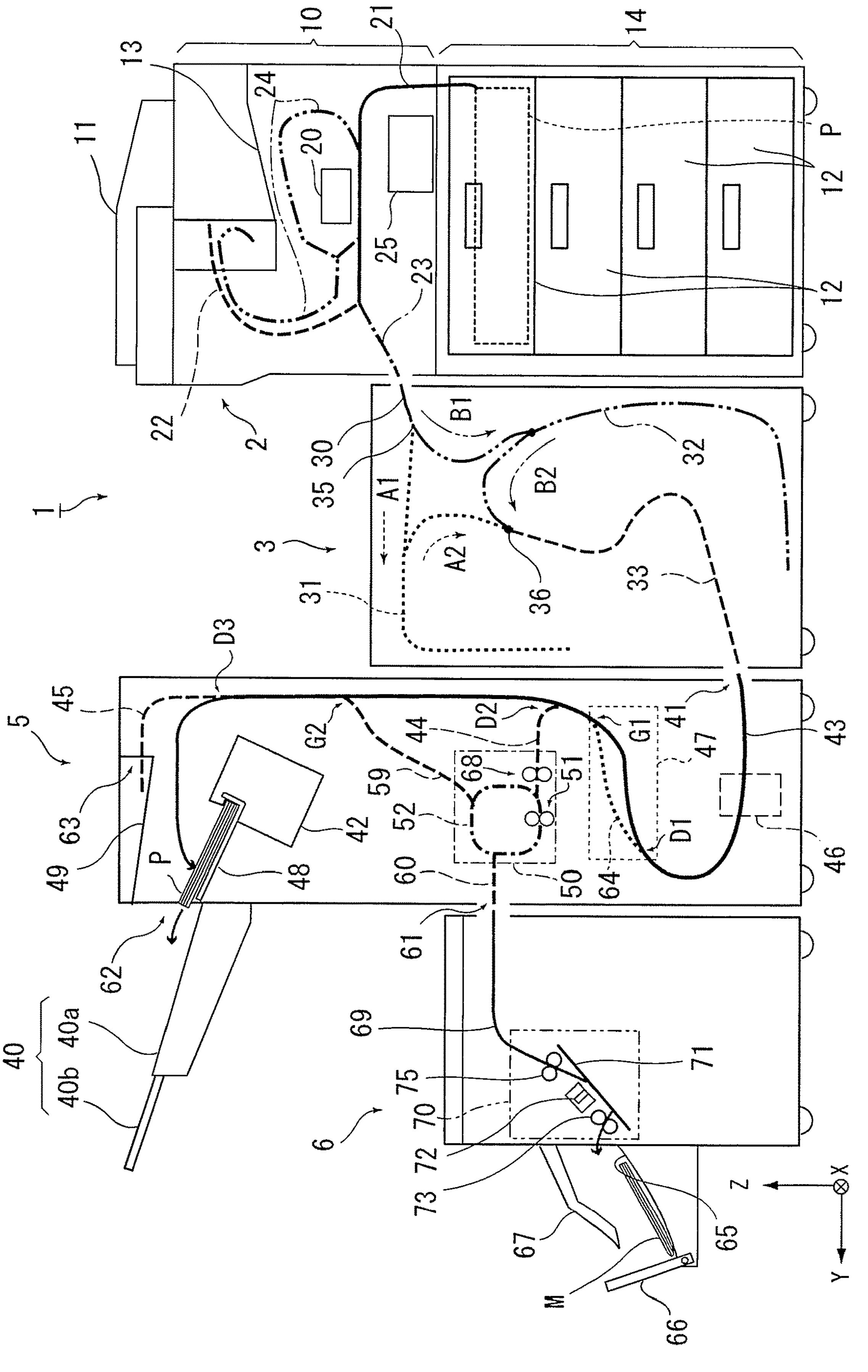
FIG. 1 is a schematic view of a recording system.

Hereinafter, the present disclosure will be schematically described.

According to an aspect of the present disclosure, a medium drying device according to a first aspect includes a transport unit that transports a medium and one heating unit that heats the medium transported by the transport unit, and is configured such that the medium can be transported to a heating area by the heating unit a plurality of times.

According to this aspect, since the medium can be transported to the heating area by the heating unit the plurality of times, the medium can be effectively dried by the one heating unit. Thus, an increase in manufacturing costs of the apparatus and an increase in the size of the apparatus can be avoided.

In the device, a second aspect of the present disclosure provides the medium drying device according to the first aspect, which includes a loop-like transport path including the heating area and configured to circumferentially transport the medium, in which as the medium passes through the loop-like transport path, the medium passes through the heating area a plurality of times.

According to this aspect, since the medium drying device includes the loop-like transport path including the heating area and configured to circumferentially transport the medium, by circumferentially transporting the medium, the medium can be transported to the heating area a plurality of times and drying processing can be performed a plurality of times, so that more reliable drying can be performed.

In the device, a third aspect of the present disclosure provides the medium drying device according to the first aspect, in which the medium can be transported to the heating area in both a first transport direction and a second transport direction that is opposite to the first transport direction. By transporting the medium in the first transport direction and the second transport direction, the medium passes through the heating area a plurality of times.

According to this aspect, the medium can be transported to the heating area in both the first transport direction and the second transport direction that is opposite to the first transport direction. Thus, by reciprocally transporting the medium in the first transport direction or the second transport direction, the medium is transported to the heating area a plurality of times, so that the drying processing can be performed a plurality of times. Thus, the medium can be more reliably dried.

In the device, a fourth aspect of the present disclosure provides the medium drying device according to any one of the first aspect to the third aspect, in which the heating unit includes a heating roller pair that holds and transports the medium between a driving roller driven to rotate and a driven roller driven to rotate by the rotation of the driving roller, and heats one or both of the driving roller and the driven roller.

According to this aspect, the heating unit includes the heating roller pair in which one or both of the driving roller and the driven roller is heated. Thus, while the medium is nipped and transported by the heating roller pair, the medium can be heated.

In the device, a fifth aspect of the present disclosure provides the medium drying device according to the fourth aspect, which further includes a pressing unit that presses the driven roller against the driving roller and a pressing force changing unit that changes a pressing force of the pressing unit.

According to this aspect, it is possible to change a nip pressure between the driving roller and the driven roller.

In the device, a sixth aspect of the present disclosure provides the medium drying device according to the fifth aspect, in which when a post-recording medium, on which recording is performed by ejecting a liquid to the medium, is dried, the pressing force of the pressing unit is changed according to an amount of liquid ejected to the medium.

According to this aspect, it is possible to appropriately dry the medium by changing the nip pressure between the driving roller and the driven roller according to the amount of the liquid ejected to the medium.

In the device, a seventh aspect of the present disclosure provides the medium drying device according to any one of the first aspect to the sixth aspect, which further includes a cooling unit that cools the medium transported to the heating area, in which the medium is cooled by the cooling unit while the medium is transported to the heating area a plurality of times.

According to this aspect, since the medium is cooled by the cooling unit while the medium is transported to the heating area a plurality of times, the medium can be effectively dried.

In the device, an eighth aspect of the present disclosure provides the medium drying device according to any one of the first aspect to the seventh aspect, which further includes an exhaust unit that is provided downstream of the heating area in a medium transport direction and discharges vapor generated from the medium by the heating, to an outside of the device.

According to this aspect, the vapor generated from the medium by the heating can be discharged to the outside of the device.

In the device, a ninth aspect of the present disclosure provides the medium drying device according to the seventh aspect, which further includes an exhaust unit that is provided downstream of the heating area in a medium transport direction and discharges vapor generated from the medium by the heating, to an outside of the device, in which the exhaust unit serves as the cooling unit.

According to this aspect, the vapor generated from the medium by the heating can be discharged to the outside of the device by the exhaust unit. At this time, since the exhaust unit also serves as the cooling unit, it is possible to avoid an increase in manufacturing costs of the device and an increase in the size of the device.

In the device, a tenth aspect of the present disclosure provides the medium drying device according to any one of the first aspect to the ninth aspect, in which a control unit, which controls the heating unit, controls the heating of the medium by the heating unit according to conditions.

According to this aspect, since the control unit, which controls the heating unit, controls the heating of the medium by the heating unit according to conditions, it is possible to appropriately dry the medium.

In the device, an eleventh aspect of the present disclosure provides the medium drying device according to the tenth aspect, in which the control unit, which controls the heating unit, controls a temperature of overheating of the heating unit according to conditions.

In the device, a twelfth aspect of the present disclosure provides the medium drying device according to the tenth aspect, in which the control unit, which controls the heating unit, controls the number of times by which the medium passes through the heating area according to conditions.

According to another aspect of the present disclosure, a medium processing apparatus according to a thirteenth aspect includes a reception unit that receives a medium to be processed, the medium drying device according to the first aspect to the twelfth aspect, which performs drying processing on the medium received from the reception unit, and a processing unit that performs processing on the medium received from the reception unit or the medium drying-processed by the medium drying device.

According to this aspect, in the medium processing apparatus including the reception unit that receives the medium to be processed, the medium drying device that performs the drying processing on the medium received from the reception unit, and the processing unit that performs the processing on the medium received from the reception unit or the medium drying-processed by the medium drying device, the same function and effect as any of the first aspect to the twelfth aspect can be obtained.

In the apparatus, a fourteenth aspect of the present disclosure provides the medium processing apparatus according to the thirteenth aspect, which further includes a saddle stitching processing unit that stitches a central portion of the medium drying-processed by the medium drying device in a medium transport direction.

According to this aspect, in addition to the processing by the processing unit, saddle stitching processing can be performed on the medium drying-processed by the medium drying device.

In the apparatus, a fifteenth aspect of the present disclosure provides the medium processing apparatus according to the thirteenth aspect, which further includes a first discharge section that discharges the medium drying-processed by the medium drying device, to an outside of an apparatus body, a second discharge section that discharges the medium processed by the processing unit, to the outside of the apparatus body, and a tray that receives the medium from the second discharge section, in which a saddle stitching unit, which is provided outside the apparatus main body, receives the medium discharged from the first discharge section, and performs saddle stitching processing of stitching a central portion of the medium in a medium discharge direction, is configured to be attached to and detached from a lower side of the tray.

According to this aspect, in addition to the processing by the processing unit, since the saddle stitching unit is configured to be detachable from the lower side of the tray, it is possible to easily switch between a configuration having the saddle stitching unit and a configuration not having the saddle stitching unit.

Further, when the saddle stitching unit is mounted, the saddle stitching unit is located below the tray. Thus, removal of the medium discharged to the tray cannot be hindered by the saddle stitching unit.

According to yet another aspect of the present disclosure, a recording system according to a sixteenth aspect includes a recording unit that includes a recording section for performing recording on a medium, and the medium processing apparatus according to any one of the thirteenth aspect to the fifteenth aspect, which processes the medium after the recording by the recording section.

According to this aspect, in the recording system, the operational effects of any one of the thirteenth aspect to the fifteenth aspect described above can be obtained.

First Embodiment

In an XYZ coordinate system shown in each drawing, an X axis direction indicates the depth direction of an apparatus, a Y axis direction indicates the width direction of the apparatus, and a Z axis direction indicates the height direction of the apparatus.

Outline of Recording System

A recording system 1 illustrated in FIG. 1 includes, as an example, a recording unit 2, an intermediate unit 3, a first unit 5 as the medium processing apparatus, and a second unit 6 as a saddle stitching unit that is detachably attached to the first unit 5, in an order from the right side to the left side of FIG. 1.

The first unit 5 is provided with a medium drying device 50 that performs drying processing on a received medium and an end stitching unit 42 that performs end stitching processing of bundling media on which recording has been performed by the recording unit 2 and stitching ends of the media. The end stitching unit 42 is an example of a processing unit that performs processing on the medium received by the first unit 5. The second unit 6 is provided with a saddle stitching processing unit 70 that performs saddle stitching processing of stitching and folding a center of a bundle of the media on which recording has been performed by the recording unit 2 to make a booklet.

The recording system 1 can be configured so as not to perform the saddle stitching processing as post-processing that is performed on the media which have been recorded by the recording unit 2 after the second unit 6 is removed. Further, illustration of the recording system 1 from which the second unit 6 is removed will be omitted.

The recording unit 2 performs recording on a transported medium. The intermediate unit 3 receives the medium, on which recording has been performed, from the recording unit 2 to send the medium to the first unit 5. The first unit 5 performs processing, such as the drying processing and the end stitching processing, on the received medium. The first unit 5 can transmit the medium after the drying processing to the second unit 6. The second unit 6 performs the saddle stitching processing.

Hereinafter, the recording unit 2, the intermediate unit 3, the first unit 5 (the medium processing apparatus), the medium drying device 50, and the second unit 6 will be described in detail in order.

In Recording Unit

The recording unit 2 will be described with reference to FIG. 1. The recording unit 2 is configured as a multifunction device including a printer unit 10 having a line head 20 as a recording section for performing recording on the medium and a scanner unit 11. In the present embodiment, the line head 20 is configured as a so-called ink jet recording head that performs recording by ejecting ink, which is liquid, onto the medium.

A cassette accommodating unit 14 including a plurality of medium accommodating cassettes 12 is provided below the printer unit 10. A medium P accommodated in the medium accommodating cassette 12 is sent to a recording area by the line head 20 through a feeding path 21 illustrated by a solid line of FIG. 1, and a recording operation is performed on the medium P. The medium on which recording has been performed by the line head 20 is sent to any one of a first discharge path 22 that is a path for discharging the medium to a post-recording discharge tray 13 provided above the line head 20 and a second discharge path 23 that is a path for sending the medium to the intermediate unit 3.

In FIG. 1, the first discharge path 22 is indicated by a broken line, and the second discharge path 23 is indicated by a one-dot chain line. The second discharge path 23 extends in a +Y direction of the recording unit 2, and delivers the medium to a reception path 30 of the adjacent intermediate unit 3.

Further, the recording unit 2 includes a reversing path 24 indicated by a two-dot chain line of FIG. 1, and is configured to be capable of double-sided recording in which after recording is performed on a first surface of the medium, the medium is reversed, and recording is performed on a second surface of the medium. Further, in each of the feeding path 21, the first discharge path 22, the second discharge path 23, and the reversing path 24, one or more roller pairs (not illustrated) are disposed as an example of a unit for transporting the medium.

The recording unit 2 is provided with a control unit 25 that controls an operation related to the transport and the recording of the medium in the recording unit 2. Further, the recording system 1 is configured such that the recording unit 2, the intermediate unit 3, the first unit 5, and the second unit 6 are mechanically and electrically coupled to each other, and the medium can be transported from the recording unit 2 to the second unit 6. The control unit 25 can control various operations of the intermediate unit 3 coupled to the recording unit 2, the first unit 5, and the second unit 6.

The recording system 1 is configured such that settings of the recording unit 2, the intermediate unit 3, the first unit 5, and the second unit 6 can be input from a operation panel which is not illustrated. The operation panel may be provided in the recording unit 2 as an example.

In Intermediate Unit

The intermediate unit 3 will be described with reference to FIG. 1. The intermediate unit 3 illustrated in FIG. 1 delivers the medium received from the recording unit 2 to the first unit 5. The intermediate unit 3 is disposed between the recording unit 2 and the first unit 5. The medium transported through the second discharge path 23 of the recording unit 2 is received by the intermediate unit 3 from the reception path 30, and is transported to the first unit 5. Further, the reception path 30 is illustrated by a solid line of FIG. 1.

In the intermediate unit 3, there are two transport paths through which the medium is transported. A first transport path is a path through which the medium is transported from the reception path 30 via a first switchback path 31 illustrated by a dotted line of FIG. 1 to a joining path 33. A second path is a path through which the medium is transported from the reception path 30 via a second switchback path 32 illustrated by a two-dot chain line of FIG. 1 to the joining path 33.

The first switchback path 31 is a path through which the medium is received in a direction of an arrow A1 and is then switched back in a direction of an arrow A2. The second switchback path 32 is a path through which the medium is received in a direction of an arrow B1 and is then switched back in a direction of an arrow B2.

The reception path 30 branches into the first switchback path 31 and the second switchback path 32 at a branching portion 35. The branching portion 35 is provided with a flap which is not illustrated that switches destination of the medium to either the first switchback path 31 or the second switchback path 32.

Further, the first switchback path 31 and the second switchback path 32 are joined at a joining portion 36. However, even when the medium is sent from the reception path 30 to either the first switchback path 31 or the second switchback path 32, the medium can be delivered to the first unit 5 through the common joining path 33.

The intermediate unit 3 receives the medium into the reception path 30 in a state in which the latest recording surface is headed to the upper side by the line head 20 from the recording unit 2. However, the medium is bent and reversed in the joining path 33, and thus the latest recording surface is headed to the lower side.

However, the medium in a state in which the latest recording surface is headed to the lower side is delivered from the +Y direction of the intermediate unit 3 to a first transport path 43 of the first unit 5.

Further, in each of the reception path 30, the first switchback path 31, the second switchback path 32, and the joining path 33, one or more roller pairs which are not illustrated are arranged as an example of a unit for transporting the medium.

When recording is continuously performed on a plurality of media in the recording unit 2, the medium that has entered the intermediate unit 3 is alternately sent to a transport path passing through the first switchback path 31 and a transport path passing through the second switchback path 32. This can increase a throughput of medium transport in the intermediate unit 3.

Further, in a case where the recording is performed by ejecting the ink (the liquid) to the medium as in the line head 20 of the present embodiment, when the processing is performed by the first unit 5 or the second unit 6 in a subsequent stage, if the medium is wet, the recording surface may be rubbed and the integrity of the medium may be poor.

By delivering the medium, on which recording has been performed, from the recording unit 2 via the intermediate unit 3 to the first unit 5, a transport time until the medium on which recording has been performed is sent to the first unit 5 can be made long, and the medium can be further dried until reaching the first unit 5 or the second unit 6.

In First Unit

Subsequently, the first unit 5 (the medium processing apparatus) will be described. The first unit 5 illustrated in FIG. 1 includes a reception unit 41 that receives the medium from the intermediate unit 3 on the lower side in a −Y direction. The medium transported along the joining path 33 of the intermediate unit 3 is input into the first unit 5 from the reception unit 41 and is delivered to the first transport path 43.

The first unit 5 includes the medium drying device 50 that performs the drying processing on the medium received from the reception unit 41 and the end stitching unit 42 as a processing unit that performs processing on the medium received from the reception unit 41 or the medium processed by the medium drying device 50.

The first unit 5 includes a first transport path 43 through which the medium received from the reception unit 41 is sent to the end stitching unit 42 and a second transport path 44 which branches from the first transport path 43 at a second branching unit D2 and through which the medium is sent to the medium drying device 50. The second branching portion D2 is provided with a flap which is not illustrated that switches a destination of the medium between the first transport path 43 and the second transport path 44.

For example, the end stitching unit 42 is a configuration unit that performs the end stitching processing of stitching the end of the medium, such as one corner of the medium and one side of the medium. As an example, the end stitching unit 42 includes a stapler.

The medium drying device 50 performs the drying processing on the medium. In the present embodiment, the medium drying device 50 dries the medium by heating the medium. Although a detailed configuration of the medium drying device 50 will be described later, the medium drying-processed by the medium drying device 50 is sent to either the end stitching unit 42 or the saddle stitching processing unit 70 provided in the second unit 6.

In the first unit 5 of the present embodiment, as illustrated in FIG. 1, the medium drying device 50 is located in a −Z direction, which is vertically below the end stitching unit 42. Further, although not illustrated, the medium drying device 50 and the end stitching unit 42 are arranged in a vertical direction (a Z axis direction), that is, are arranged to have an overlapping portion when viewed from the top.

The medium drying device 50 and the end stitching unit 42 are arranged in such a positional relationship, so that an increase in a horizontal dimension of the first unit 5 can be suppressed, and the device can be miniaturized.

Further, as illustrated in FIG. 1, the first unit 5 includes a punching processing unit 46 that performs punching processing on the medium received from the reception unit 41. The punching processing unit 46 is installed at a position, close to the reception unit 41, of the first transport path 43 through which the medium received by the first unit 5 passes, and is configured to be able to perform the punching processing upstream of the first transport path 43. The punching processing unit 46 is disposed vertically below the medium drying device 50. Further, although not illustrated, the punching processing unit 46 is also disposed to have a portion overlapping the medium drying device 50 and the end stitching unit 42 when viewed in a vertical direction, that is, when viewed from the top. Further, only the medium drying device 50 and the punching processing unit 46 may overlap each other or only the end stitching unit 42 and the punching processing unit 46 may overlap each other.

The medium received from the reception unit 41 can be sent to a processing tray 48 through the first transport path 43 illustrated in FIG. 1. The medium sent to the processing tray 48 may or may not have been punched by the punching processing unit 46. In the processing tray 48, the media are stacked on the processing tray 48 while rear ends of the media in a transport direction are aligned with each other. When the predetermined number of media P are stacked on the processing tray 48, the end stitching processing by the end stitching unit 42 is performed at rear ends of the media P. The first unit 5 includes a second discharge section 62 that discharges the medium in the +Y direction. Further, the first unit 5 includes a first discharge section 61 and a third discharge section 63 in addition to the second discharge section 62, and is configured to be able to discharge the medium from the first to third discharge sections 61, 62, and 63.

The medium processed by the end stitching unit 42 is placed on a first tray 40 as a tray that receives the medium discharged from the second discharge section 62, while being discharged from the second discharge section 62 to the outside of the apparatus of the first unit 5 by a discharge unit which is not illustrated. The first tray 40 is provided to protrude from the first unit 5 in the +Y direction. In the present embodiment, the first tray 40 includes a base portion 40*a* and an extension portion 40*b*, and the extension portion 40*b* is configured to be accommodatable in the base portion 40*a*.

Further, a third transport path 45 branching from the first transport path 43 at a third branching portion D3 downstream of the second branching portion D2 is coupled to the first transport path 43. The third branching portion D3 is provided with a flap which is not illustrated that switches a destination of the medium between the first transport path 43 and the third transport path 45.

An upper tray 49 is provided at an upper portion of the first unit 5. The third transport path 45 continues from the third branching portion D3 to the third discharge section 63 which will be described below, and the medium transported through the third transport path 45 is discharged from the third discharge section 63 to the upper tray 49 by a discharge unit which is not illustrated. The medium punching-processed by the punching processing unit 46 can be placed on the upper tray 49. Further, the medium on which no punching processing is performed and no processing is performed after the recording can be stacked.

The first transport path 43 is provided with an overlapping path 64 which branches from the first transport path 43 at a first branching portion D1 and is rejoined to the first transport path 43 at a first junction portion G1. The overlapping path 64 constitutes an overlapping processing unit 47 that stacks two sheets of the media and sends the two media to the medium drying device 50 or the end stitching unit 42. A leading medium transported in advance is sent to the overlapping path 64, and a trailing medium transported through the first transport path 43 is joined to the first junction portion G1, so that the leading medium and the trailing medium can be transported downstream of the first junction portion G1 while overlapping each other. Further, the overlapping processing unit 47 may be configured to provide a plurality of overlapping paths 64 and to send three or more sheets of the media to the downstream side while the media overlap each other. In the first unit 5, while the overlapping processing unit 47 is located vertically below the medium drying device 50, the medium drying device 50, the end stitching unit 42, and the overlapping processing unit 47 partially overlap each other when viewed from the vertical direction, that is, when viewed from the upper surface. Further, only the medium drying device 50 and the overlapping processing unit 47 may overlap each other or only the end stitching unit 42 and the overlapping processing unit 47 may overlap each other.

In the first unit 5, one or more roller pairs which are not illustrated as an example of a unit that transports the medium are arranged in each of the first transport path 43, the second transport path 44, and the third transport path 45.

In Medium Drying Device

Next, the medium drying device 50 as a first processing unit will be described.

The medium on which the recording has been performed by ejecting the ink (the liquid) from the line head 20 of the recording unit 2 is dried by evaporating the ink to some extent while being transported through the intermediate unit 3. However, when the medium is not sufficiently dried, if a plurality of media are aligned with each other in order to perform the end stitching processing and the saddle stitching processing, the integrity may be poor. Before the medium illustrated in FIG. 1 is sent to the end stitching unit 42 and the saddle stitching processing unit 70, the medium can be dried in the medium drying device 50.

Figure 2:
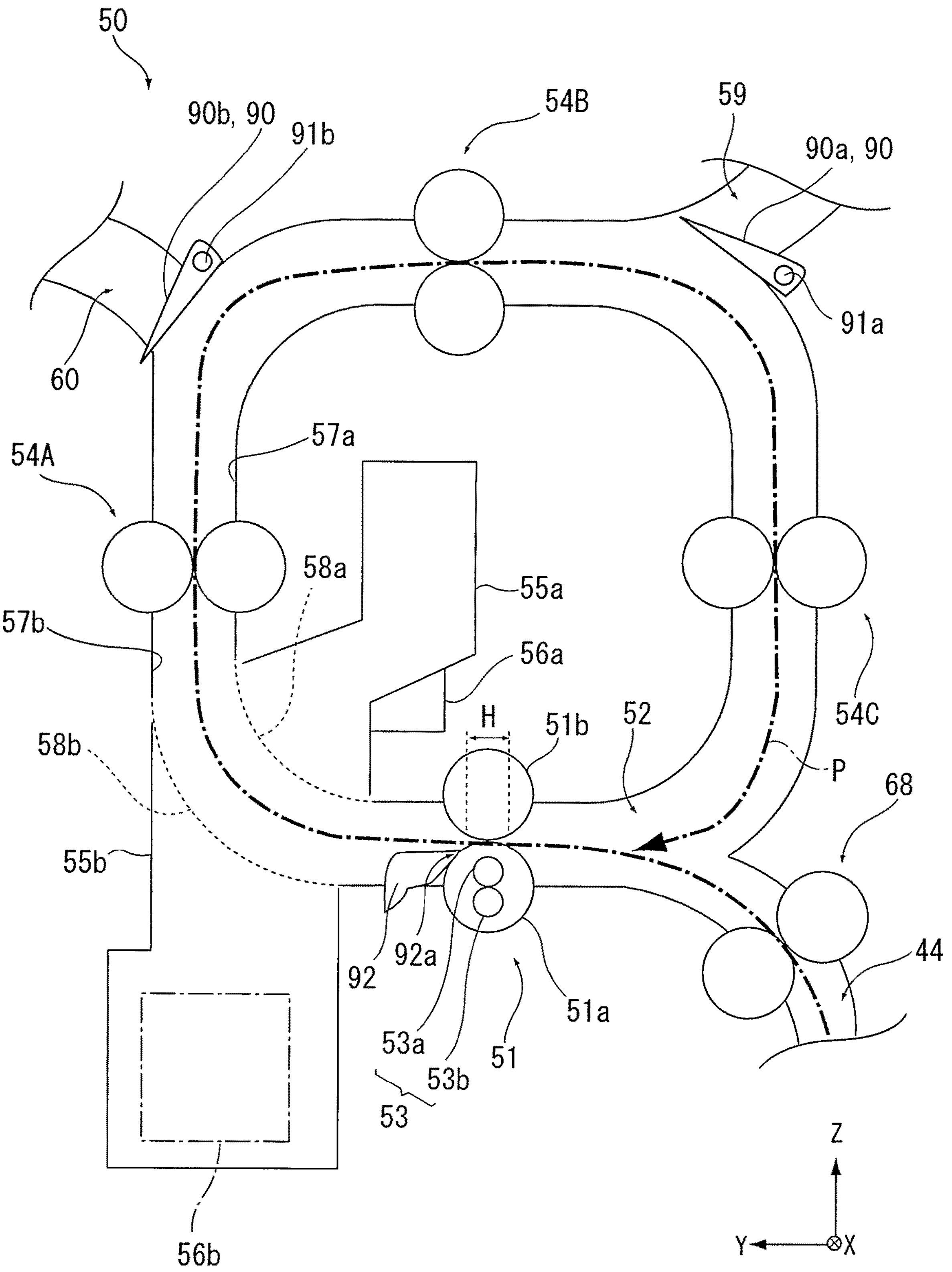
FIG. 2 is a schematic side view of a drying processing unit.

The medium drying device 50 includes a transport roller pair 68 as a transport unit that transports the medium and a heat roller pair 51 as one heating unit that heats the medium transported by the transport roller pair 68. As illustrated in FIG. 2, the transport roller pair 68 is provided in the second transport path 44. Further, the heat roller pair 51 is configured as a heating roller pair that holds the medium between a drying driving roller 51*a* that is a driving roller driven by a driving source which is not illustrated and a drying driven roller 51*b* that is a driven roller driven to rotate by rotation of the drying driving roller 51*a*.

In the present embodiment, the drying driving roller 51*a* is configured to be heated. Therefore, the medium can be heated while the medium is nipped and transported by the heat roller pair 51.

Here, when the drying processing is performed on the medium P by the heat roller pair 51, if the medium P just passes through the heat roller pair 51 once, a liquid component may remain near a center of the medium in the thickness direction or on the surface side which the drying driving roller 51*a* does not contact, and the medium P might not be sufficiently dried. When the drying driven roller 51*b* is also heated, the liquid component is easily evaporated from both surfaces of the medium. However, the liquid component L may remain near a center of the medium in the thickness direction.

Therefore, the medium drying device 50 of the present embodiment is configured to be able to transport the medium to a heating area H (FIG. 2) by the heat roller pair 51 (a heating unit) a plurality of times. Further, the heating area H is an area where heat generated by the drying driving roller 51*a* is transmitted to the medium. Since the heating area H is changed even depending on the temperature of the drying driving roller 51*a*, the heating area H is not limited as a strict range. However, the heating area H is generally an area near the drying driving roller 51*a*.

In the present embodiment, as illustrated in FIG. 2, the medium drying device 50 includes the heat roller pair 51 as a configuration for transporting the medium to the heating area H a plurality of times and includes a loop-like transport path 52 that can circumferentially transport the medium. Then, as the medium passes through the loop-like transport path 52, the medium passes through the heating area H a plurality of times.

The medium is transported to the heating area K by the heat roller pair 51 through the loop-like transport path 52 a plurality of times. Thus, the drying processing is performed on the medium by the one heat roller pair 51 a plurality of times, so that the medium can be more certainly dried. Thus, the increase in manufacturing costs of the apparatus and the increase in the size of the apparatus can be avoided. Further, it is not necessary to supply a current to a heat source of the plurality of heat roller pairs 51, and power consumption can be suppressed.

The loop-like transport path 52 is formed by an inner path forming portion 57*a* and an outer path forming portion 57*b*, and the medium is transported through a space between the inner path forming portion 57*a* and the outer path forming portion 57*b*. The second transport path 44 branching from the first transport path 43 (FIG. 1) is joined to the loop-like transport path 52 upstream of the heat roller pair 51. Thus, the medium can be sent by the transport roller pair 68 provided in the second transport path 44 and can be introduced into the loop-like transport path 52.

In Heat Roller Pair

Figure 3:
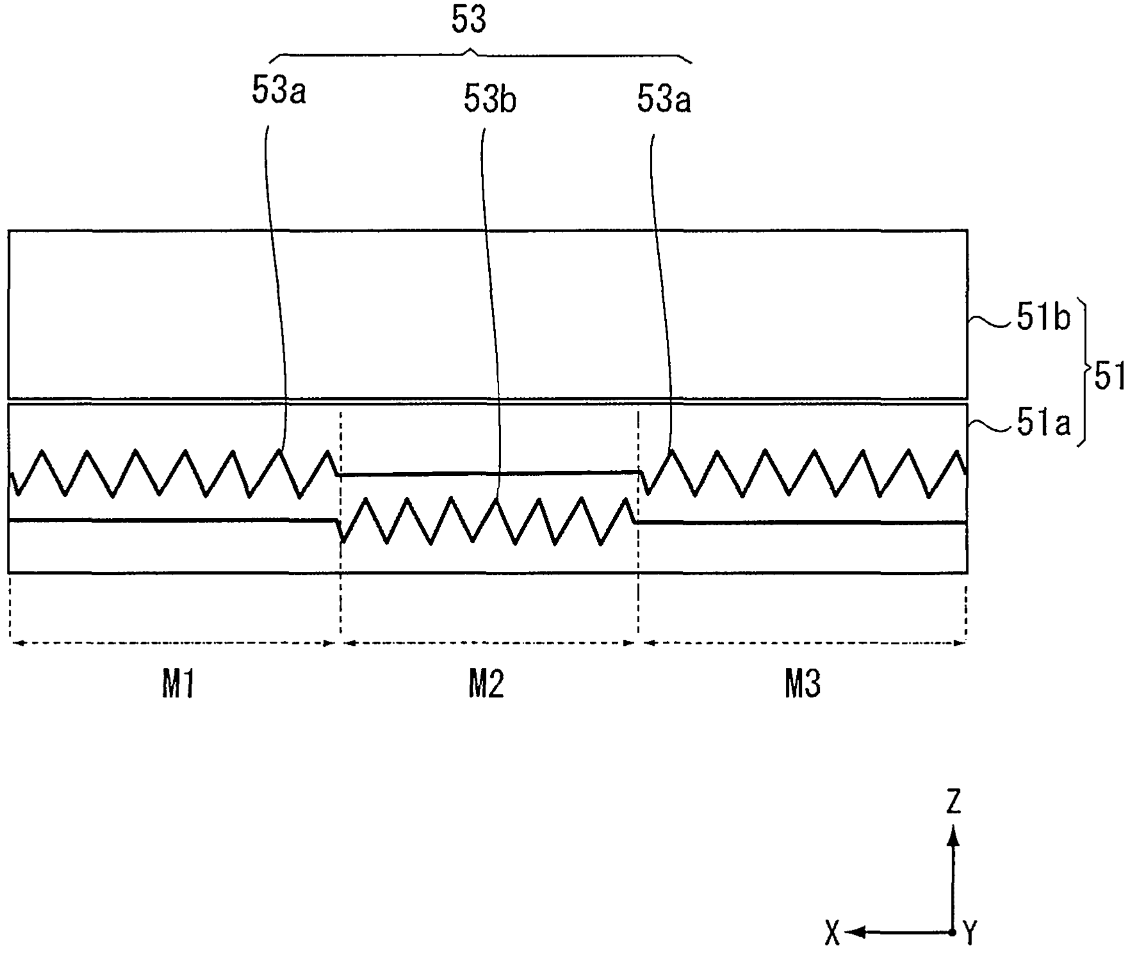
FIG. 3 is a diagram illustrating a configuration of a heat roller pair.

The drying driving roller 51*a* that is a heated roller in the heat roller pair 51 includes, as an example, an induction coil 53 illustrated in FIGS. 2 and 3 inside the roller, and can be heated in an induction heating method in which the roller is heated by an action of a magnetic field generated by causing a current to flow through the induction coil 53. Further, in addition to the induction heating method, for example, a halogen lamp can also be used as a heat source.

The drying driving roller 51*a* is made of, as an example, a metal material having high thermal conductivity. Further, the drying driven roller 51*b* is formed of an elastic material such as a sponge formed of a resin material.

The heating temperature of the drying driving roller 51*a* can be adjusted by turning on and off heating by the induction coil 53. Further, for example, the temperature can be adjusted by controlling a duty ratio of the current flowing through the induction coil 53. Further, in the present embodiment, the control unit 25 illustrated in FIG. 1 controls driving and heating of the drying driving roller 51*a*. The medium drying device 50 can be provided with a temperature detection unit which is not illustrated that detects the roller temperature of the drying driving roller 51*a*.

In the present embodiment, as illustrated in FIGS. 2 and 3, two coils of a first induction coil 53*a* and a second induction coil 53*b* are provided as the induction coil 53.

As illustrated in FIG. 3, the first induction coil 53*a* and the second induction coil 53*b* are disposed offset from each other in the X axis direction, which is the width direction of the medium. Accordingly, the heating area of the drying driving roller 51*a* is divided into a plurality of parts in the X axis direction.

In FIG. 3, the first induction coil 53*a* heats end areas M1 and M3 of the drying driving roller 51*a* in a medium width direction, and the second induction coil 53*b* heats an intermediate area M2 of the drying driving roller 51*a* in the medium width direction. With this configuration, the end areas M1 and M3 and the intermediate area M2 can be heated individually, and the heating areas in the medium width direction can be switched.

Further, three or more induction coils 53 having different heating areas in the medium width direction may be provided or the entire area in the medium width direction may be heated by one induction coil 53.

Further, as in the present embodiment, in the heat roller pair 51, at least one of the drying driving roller 51*a* and the drying driven roller 51*b* constituting the heat roller pair 51 may be heated or only the drying driven roller 51*b* may be heated.

Further, both the drying driving roller 51*a* and the drying driven roller 51*b* may be heated. When both the drying driving roller 51*a* and the drying driven roller 51*b* are heated, both surfaces of a paper sheet are heated, so that the paper sheet can be more certainly dried.

As described above, the medium sent from the intermediate unit 3 is input from the reception unit 41 via the first transport path 43 to the second transport path 44 of the first unit 5 illustrated in FIG. 1 in a state in which the latest recording surface faces the lower side. Then, the medium is nipped by the heat roller pair 51 in a state in which the latest recording surface faces the lower side. Therefore, among the heat roller pair 51 illustrated in FIGS. 2 and 3, the heated drying driving roller 51*a* comes into contact with the latest recording surface of the medium. That is, since the latest recording surface can be directly heated, the liquid component contained in the medium can be effectively heated, and the medium can be dried.

In Exhaust Unit

Further, as illustrated in FIG. 2, a first duct 55*a* and a second duct 55*b* as an exhaust unit that discharges vapor generated from the medium by the heating to the outside of the first unit 5 are provided downstream of the heating area H by the heat roller pair 51 in a medium transport direction and upstream of a first transport roller pair 54A.

Figure 5:
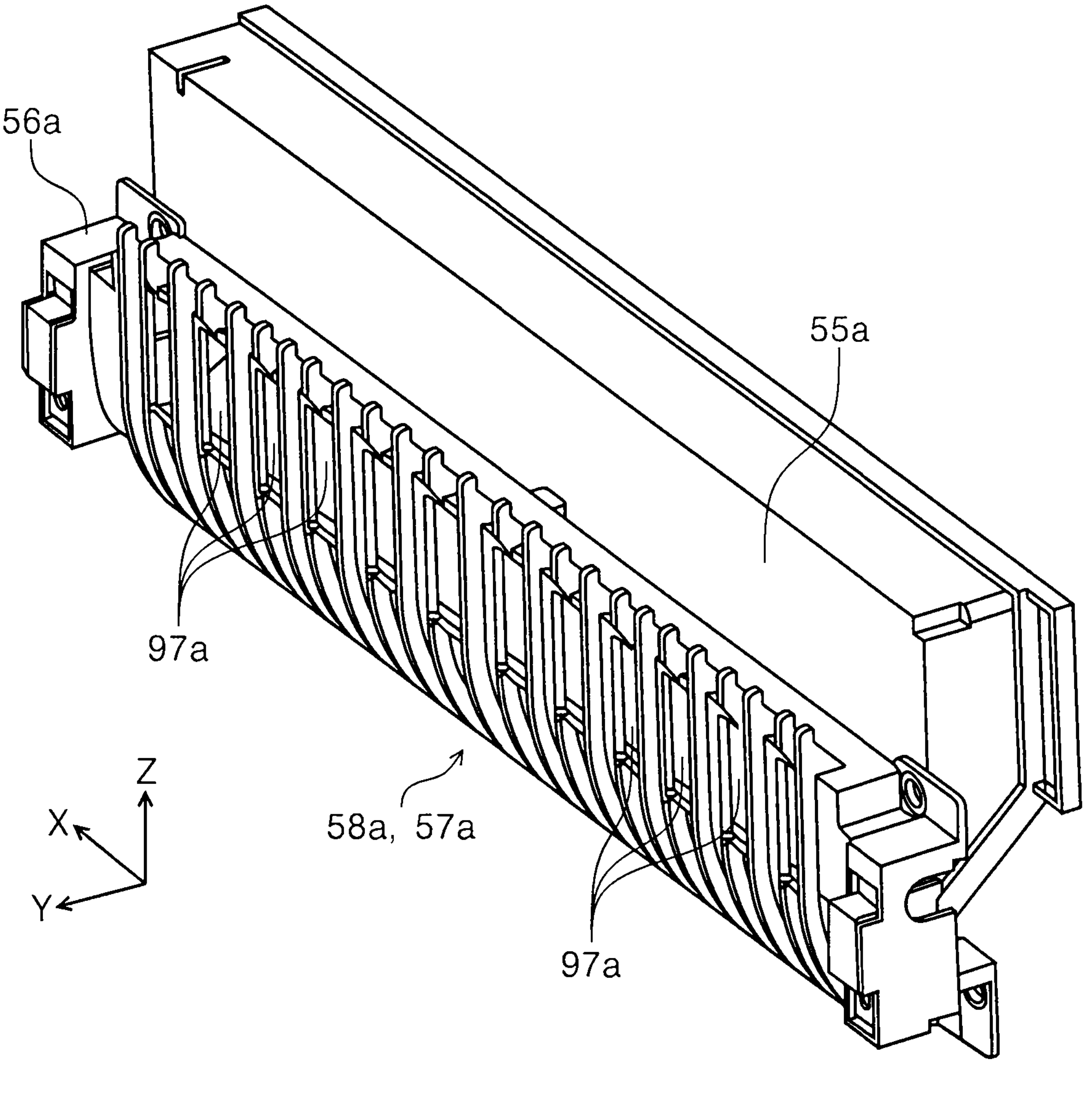
FIG. 5 is a perspective view illustrating a first duct.
Figure 6:
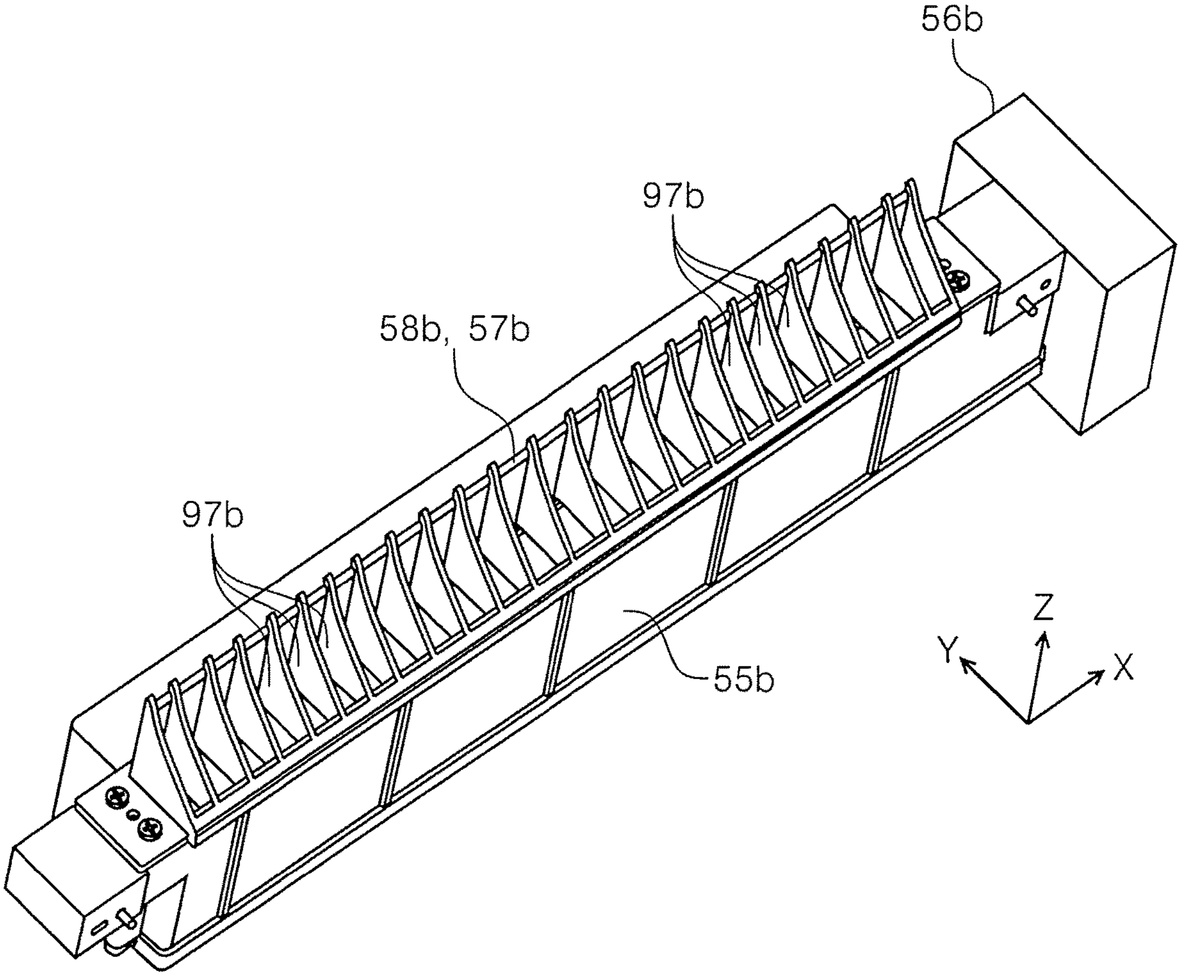
FIG. 6 is a perspective view illustrating a second duct.

In FIG. 2, suction in the first duct 55*a* is performed by a first fan 56*a* (see also FIG. 5), and suction in the second duct 55*b* is performed by a second fan 56*b* (see also FIG. 6).

Portions corresponding to the first duct 55*a* and the second duct 55*b* in the inner path forming portion 57*a* and the outer path forming portion 57*b* illustrated in FIG. 2 are formed by an inner suction portion 58*a* having a hole 97*a* through which air of the loop-like transport path 52 passes, as illustrated in FIG. 5, and an outer suction portion 58*b* having a hole 97*b* through which the air of the loop-like transport path 52 passes, as illustrated in FIG. 6. Further, the air of the loop-like transport path 52 can be sucked from the hole 97*a* or the hole 97*b* by the first duct 55*a* or the second duct 55*b*.

As illustrated in FIGS. 5 and 6, the inner suction portion 58*a* and the outer suction portion 58*b* may be formed in a vertical grid shape along the medium transport direction, may be formed by providing holes in a plate-like body, or may be formed in a mesh shape.

By providing the first duct 55*a* and the second duct 55*b*, it is possible to quickly discharge the vapor generated when the medium containing the ink (the liquid) is heated by the heat roller pair 51, to the outside of the apparatus.

The medium drying device 50 can be provided with a cooling unit for cooling the medium transported to the heating area H. In the present embodiment, the first duct 55*a* and the second duct 55*b* as the exhaust unit also serve as the cooling unit. The medium can be cooled by flow of air drawn into the first duct 55*a* and the second duct 55*b*.

Since the first duct 55*a* and the second duct 55*b* are provided in the loop-like transport path 52, the medium can be cooled while the medium is transported to the heating area H a plurality of times. That is, the heating of the medium by the heat roller pair 51 and the cooling of the medium by the first duct 55*a* and the second duct 55*b* can be alternately performed a plurality of times. Accordingly, the medium can be effectively dried.

Further, since the first duct 55*a* and the second duct 55*b* as the exhaust unit also serve as the cooling unit, an increase in manufacturing costs of the apparatus and an increase in the size of the apparatus can be avoided. Further, the medium drying device 50 may be configured to include a cooling unit different from the first duct 55*a* and the second duct 55*b*.

Figure 4:
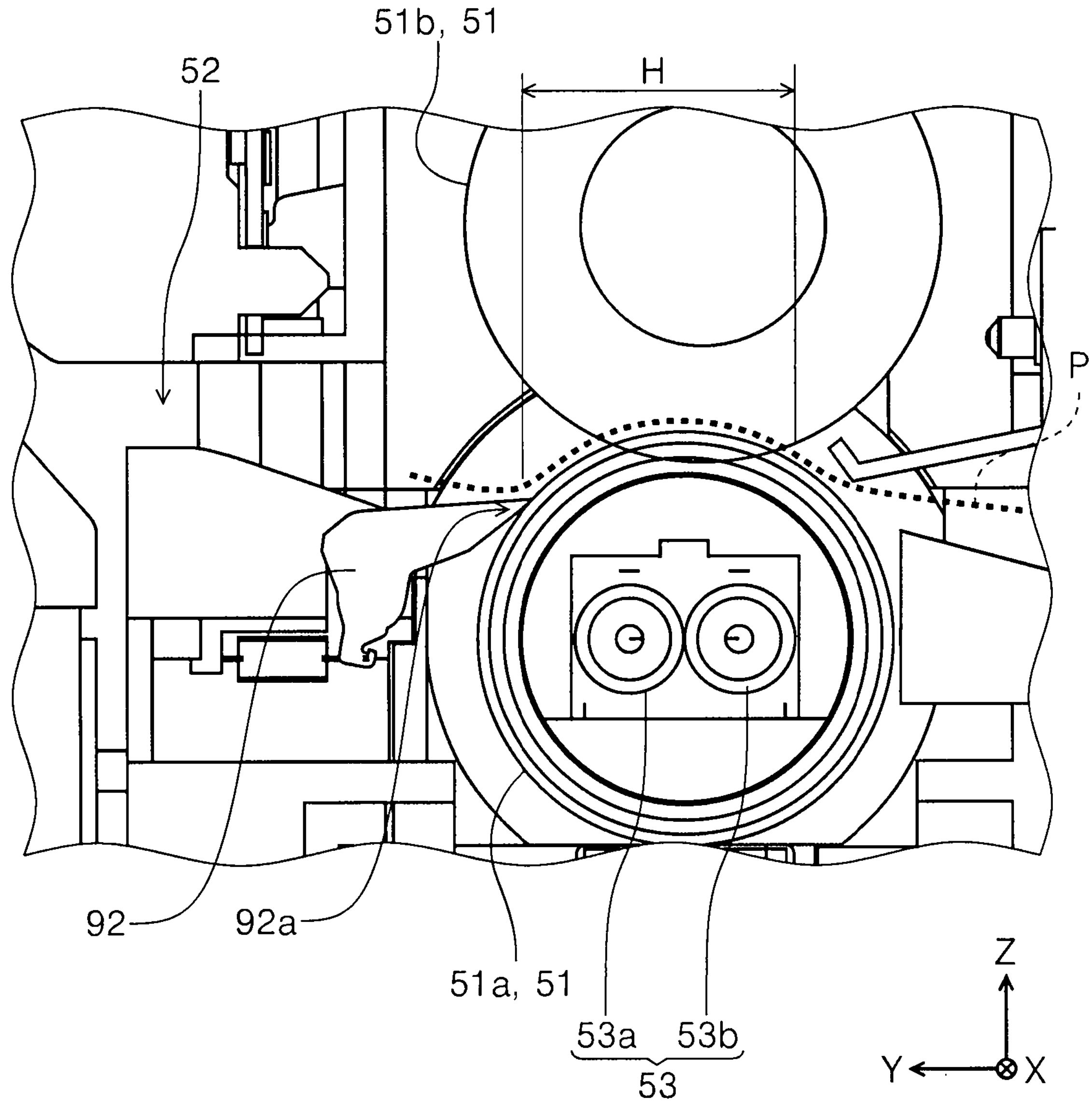
FIG. 4 is an enlarged side sectional view illustrating a main portion of a medium drying device.

Further, as illustrated in FIGS. 2 and 4, a peeling member 92 that peels the medium P from the drying driving roller 51*a* is provided downstream of the drying driving roller 51*a*. In the peeling member 92, a tip end portion 92*a* is in contact with the drying driving roller 51*a*.

When the medium P is nipped and transported by the heat roller pair 51, as illustrated in FIG. 4, the medium P may stick along an outer periphery of the drying driving roller 51*a* being heated. In the present embodiment, the peeling member 92 peels, from the drying driving roller 51*a*, the medium P stuck to the outer periphery of the drying driving roller 51*a*, so that the medium P can be transported properly.

In Transport Path of Medium after Drying Processing

In the loop-like transport path 52 illustrated in FIG. 2, a fourth transport path 59 is connected downstream of a second transport roller pair 54B and upstream of a third transport roller pair 54C. The fourth transport path 59 is a path that is joined to the first transport path 43 at a second junction portion G2 (see FIG. 1) and returns, to the first transport path 43, the medium drying-processed by the heat roller pair 51.

Further, in the loop-like transport path 52, a fifth transport path 60 is connected downstream of the first transport roller pair 54A and upstream of the second transport roller pair 54B. The fifth transport path 60 is a path coupled to the first discharge section 61 illustrated in FIG. 1 and is a path for feeding, toward the second unit 6, the medium drying-processed by the heat roller pair 51.

Further, the first unit 5 illustrated in FIG. 1 includes a switching flap 90 (FIG. 2) as a switching member that is switchable between a first state in which the medium processed by the medium drying device 50 is sent to the first discharge section 61 and a second state in which the medium processed by the medium drying device 50 is sent to the end stitching unit 42.

In the present embodiment, the switching flap 90 includes two flaps of a first switching flap 90*a* and a second switching flap 90*b*.

In more detail, in the loop-like transport path 52 illustrated in FIG. 2, the first switching flap 90*a* is provided in a connection portion with the fourth transport path 59 and the second switching flap 90*b* is provided at a connection portion with the fifth transport path 60.

The first switching flap 90*a* includes a first shaft portion 91*a* and is configured to be pivotable about the first shaft portion 91*a*. The second switching flap 90*b* includes a second shaft portion 91*b* and is configured to be pivotable about the second shaft portion 91*b*.

The first switching flap 90*a* and the second switching flap 90*b* are operated by a motor which is not illustrated or an electromagnetic clutch which is not illustrated, and the operation can be controlled by the control unit 25 provided in the recording unit 2 as an example.

When the medium is transported around the loop-like transport path 52, as illustrated in FIG. 2, the first switching flap 90*a* and the second switching flap 90*b* are in a posture of closing the fourth transport path 59 and the fifth transport path 60, respectively. Hereinafter, a state of the switching flap 90 illustrated in FIG. 2 is referred to as a circumferential state.

Figure 7:
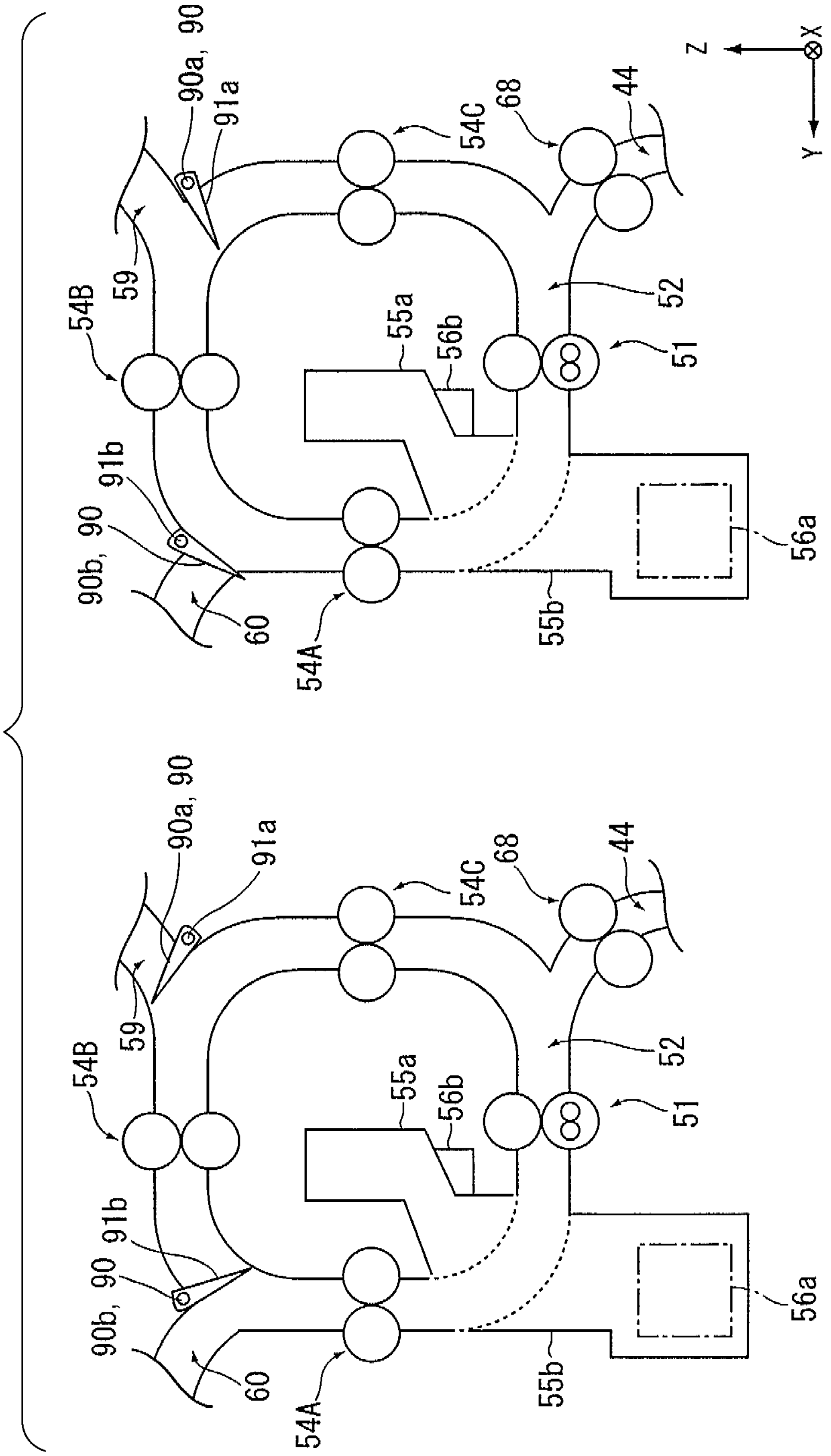
FIG. 7 is a diagram for illustrating a switching flap operation of switching a first state in which a medium processed by a drying unit is sent to a first discharge section and a second state in which the medium processed by the drying unit is sent to an end stitching unit.

When the medium processed by the medium drying device 50 is sent to the first discharge section 61, that is, when the medium is sent to the fifth transport path 60, the switching flap 90 is brought into the first state illustrated in a left view of FIG. 7 from the circumferential state of FIG. 2. In the first state, the second switching flap 90*b* opens the fifth transport path 60, and swings in a posture of closing the loop-like transport path 52. The first switching flap 90*a* remains in a posture of closing the fourth transport path 59.

By setting the switching flap 90 in the first state, the medium dry-processed through the heat roller pair 51 can be sent to the fifth transport path 60, and the medium can be delivered from the first discharge section 61 to the second unit 6.

When the medium processed by the medium drying device 50 is sent to the end stitching unit 42, that is, when the medium is sent to the fourth transport path 59, the switching flap 90 is brought into the second state illustrated in a right view of FIG. 7 from the circumferential state of FIG. 2. In the second state, the first switching flap 90*a* opens the fourth transport path 59, and swings in a posture of closing the loop-like transport path 52. The second switching flap 90*b* remains in a posture of closing the fifth transport path 60.

By setting the switching flap 90 in the second state, the medium dry-processed by the heat roller pair 51 can be sent to the fourth transport path 59, and can be sent to the end stitching unit 42.

By providing the switching flap 90 as described above, the drying processing can be performed both when the medium is sent to the second unit 6 and when the medium is sent to the end stitching unit 42.

Further, as illustrated in FIG. 1, the loop-like transport path 52 is accommodated within an area of the end stitching unit 42 (a second processing unit) when viewed from a horizontal direction. Further, although illustration is omitted, the length of the medium drying device 50 in the X axis direction is substantially the same as the length of the end stitching unit 42, and the loop-like transport path 52 is accommodated within the area of the end stitching unit 42 even in the X axis direction.

As the loop-like transport path 52 is accommodated within the area of the end stitching unit 42 when viewed from the horizontal direction, an increase in the horizontal dimension of the apparatus can be effectively suppressed, and the apparatus can be miniaturized.

Further, the medium drying device 50 may be configured not to have the loop-like transport path 52. This configuration will be described in the second embodiment.

Another Configuration of Heat Roller Pair

In the heat roller pair 51, the drying driven roller 51*b* is configured to be pressed against the drying driving roller 51*a* with a predetermined pressing force. Then, the pressing force of the drying driven roller 51*b* against the drying driving roller 51*a* can be changed.

Figure 8:
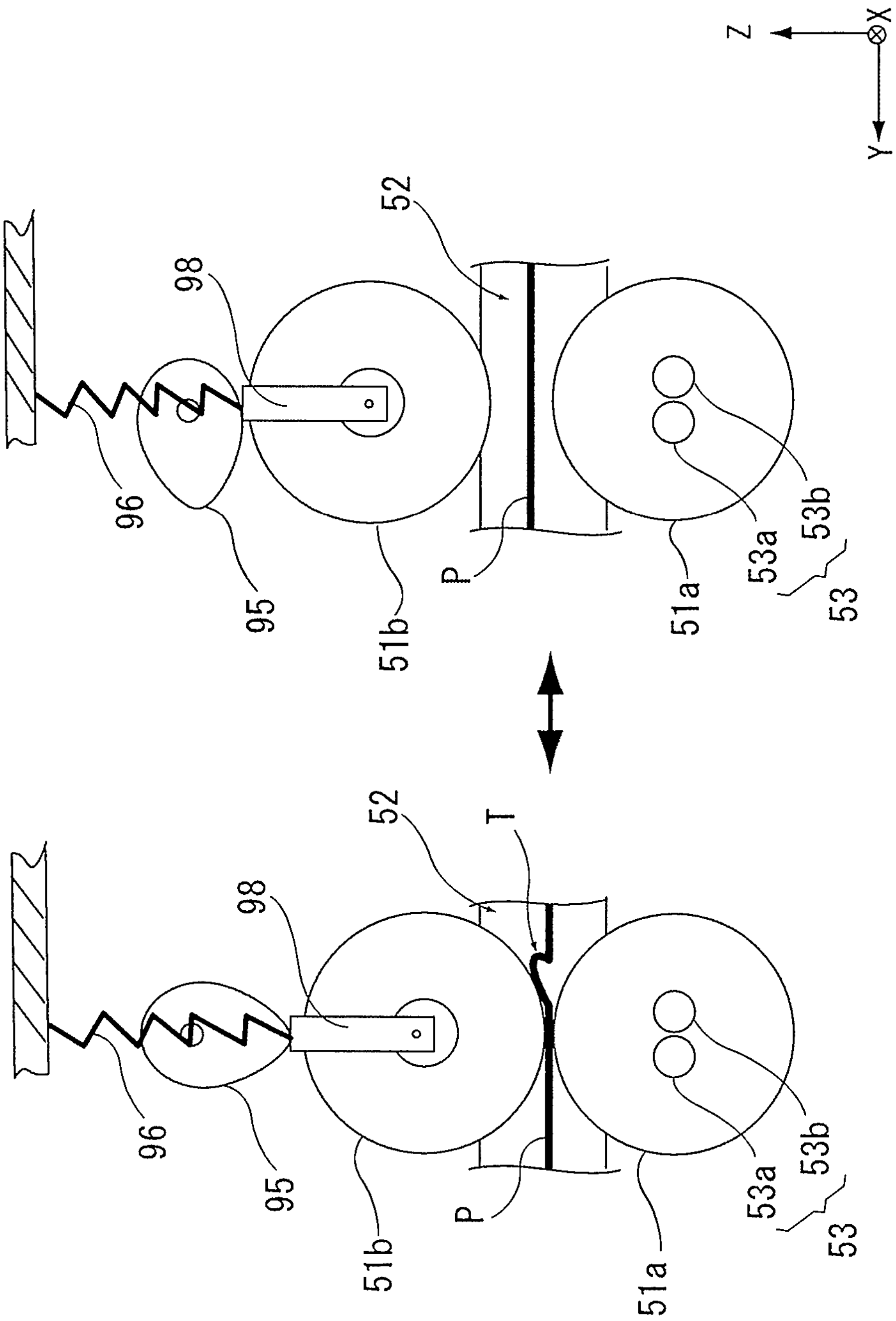
FIG. 8 is a diagram illustrating a pressing force changing unit of a drying driven roller.

In more detail, as illustrated in FIG. 8, the medium drying device 50 includes a pressing unit 96 that presses the drying driven roller 51*b* against the drying driving roller 51*a* and an eccentric cam 95 as a pressing force changing unit for changing the pressing force of the pressing unit 96. In the present embodiment, the pressing unit 96 is a tension spring.

The pressing unit 96 is provided between a holder 98 that holds the drying driven roller 51*b* and a predetermined fixed position in the apparatus. Then, the pressing force of the drying driven roller 51*b* against the drying driving roller 51*a* can be changed by rotating the eccentric cam 95 which is in contact with the holder 98 and is rotated by a driving source which is not illustrated.

Further, in FIG. 8, the drying driven roller 51*b* is largely retracted from the loop-like transport path 52 in order to make a change in a state of the pressing unit 96 easy to understand. However, the drying driven roller 51*b* can be advanced and retracted with respect to the drying driving roller 51*a* while maintaining a state in which the drying driven roller 51*b* is in contact with the drying driving roller 51*a*, so that the pressing force can be changed.

The nip pressure of the heat roller pair 51 can be changed by changing the pressing force of the drying driven roller 51*b* against the drying driving roller 51*a*.

The rotation of the eccentric cam 95 is controlled by the control unit 25, whereby the pressing force of the drying driven roller 51*b* against the drying driving roller 51*a* can be changed to adjust the nip pressure of the heat roller pair 51. The control unit 25 can detect the phase of the eccentric cam 95 by an encoder which is not illustrated.

In Adjustment of Pressing Force of Drying Driven Roller Against Drying Driving Roller The pressing force of the drying driven roller 51*b* against the drying driving roller 51*a*, in other words, the nip pressure of the heat roller pair 51, can be changed according to conditions.

In more detail, when the recorded medium, which is recorded by ejecting the ink as the liquid to the medium, is dried, the pressing force of the pressing unit 96 is changed according to the amount (the amount of ejected liquid) of the ink ejected to the medium.

When the amount of the ink ejected to the medium is large, the medium may be in an expanded state. In general, the medium is provided with margins on the upper side, the lower side, the right side, and the left side, and recording is performed on a central area of the medium. Thus, only the central area of the medium may be in an expanded state. When the medium P in a partially expanded state is transported by the heat roller pair 51, if the nip pressure of the heat roller pair 51 is high, as in the medium P illustrated in a left view of FIG. 8, expansion T may be shifted in the −Y direction, and thus wrinkles may occur.

In order to suppress such a defect, for example, the control unit 25 can adjust the pressing force of the drying driven roller 51*b* against the drying driving roller 51*a*, based on a table indicating a relationship between the nip pressure of the heat roller pair 51 according to the amount of the liquid ejected to the medium as represented in Table 1 below and the pressing force of the drying driven roller 51*b* against the drying driving roller 51*a*.

Further, hereinafter, a recording concentration (%) is used as a value corresponding to the amount of the ink ejected to the medium P. The recording concentration (%) is a value that increases or decreases according to the amount of the ejected ink, and is a ratio of a total ink discharge amount (g) to the total ink ejection amount (g) to a recordable area of one paper sheet. That is, a recording density (%) is equal to the total ink ejection amount (g)/the maximum ink injection amount (g) to one paper sheet×100. The maximum ink injection amount (g) to the recordable area of one paper sheet can be obtained from the maximum ink injection amount (g) per unit area by the line head 20 provided in the recording unit 2.

Further, the present disclosure is not limited thereto. The recording density (%) can also be a ratio of the area where the ink is ejected to the area of the one paper sheet.

TABLE 1

| Recording density (%) Amount of ink ejected to medium | Nip pressure of heat roller pair | Pressing force of drying driven roller |
|---|---|---|
| Equal to or more than 0 and less than 10 | High pressure | Large |
| Equal to or more than 10 and less than 20 | High pressure | Large |
| Equal to or more than 20 and less than 30 | High pressure | Large |
| Equal to or more than 30 and less than 40 | Middle pressure | Middle |
| Equal to or more than 40 and less than 50 | Middle pressure | Middle |
| Equal to or more than 50 and less than 60 | Low pressure | Small |
| . | . | . |
| . | . | . |
| . | . | . |

When the recording density of the medium increases, a possibility of swelling the medium increases. Thus, as the recording density increases, the nip pressure of the heat roller pair 51 decreases. Therefore, as the recording density increases, the pressing force of the drying driven roller 51*b* to the drying driving roller 51*a* is reduced. Accordingly, when the medium having a high recording density, that is, the medium having a large amount of the ejected ink, is transported by the heat roller pair 51, a possibility of occurrence of wrinkles in the medium can be reduced.

Further, the control unit 25 can control the heating of the medium by the heat roller pair 51 according to conditions. In more detail, the control unit 25 determines whether or not the heating is performed by the heat roller pair 51 according to conditions, that is, controls an ON state or an OFF state of the heating, a heating temperature during the heating, and the number of times by which the medium passes through the heating area H (FIG. 2) by the heat roller pair 51.

The conditions used by the control unit 25 include the amount of the ink ejected to the medium P during the recording by the recording unit 2, whether or not the recording on the medium P corresponds to double-sided recording or single-sided recording, environmental conditions such as a temperature and a humidity when the medium P is dried, and conditions related to the medium, such as the type, the rigidity, the thickness, and the basis weight of the medium. The control unit 25 may use one or more conditions among these conditions.

Hereinafter, control of the heat roller pair 51, performed by the control unit 25 using the temperature and the humidity in an installation environment of the apparatus and the amount of the ink ejected to the medium P as conditions, will be described.

The control unit 25 has a control table corresponding to the temperature in the installation environment, the humidity in the installation environment, and the amount (the recording density) of the ejected ink.

Figure 9:
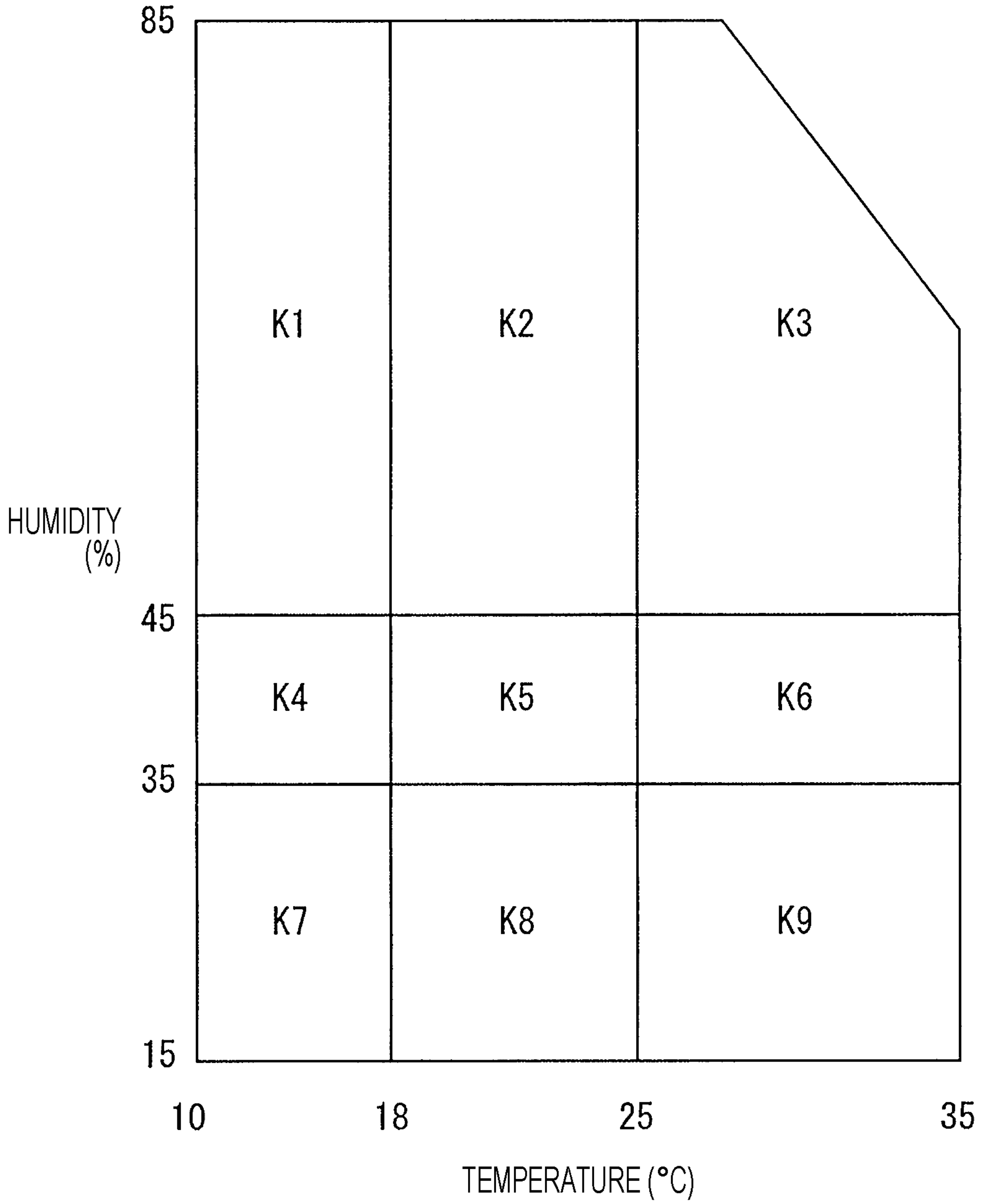
FIG. 9 is a diagram illustrating divisions according to a relationship between the temperature and the humidity of an installation environment of the apparatus.

The temperature and the humidity of the installation environment of the apparatus may be the temperature and the humidity inside a room where the recording system 1 is installed. Further, a humidity measuring unit which is not illustrated and a temperature measuring unit which is not illustrated are provided inside the recording unit 2, and measurement results thereof may be used. Either the temperature or the humidity may be used. However, in the present embodiment, an installation environment of the apparatus is divided into nine segments K1 to K9 according to a relationship between the temperature and the humidity in a temperature and humidity environment, as illustrated in FIG. 9.

An example of a control table is represented in Table 2. The control table indicates the ON state or the OFF state of the heating by the heat roller pair 51, and the number of times by which the heating processing is performed by the heat roller pair 51, that is, the number of turns of the loop-like transport path 52, which are determined according to division of the installation environment of the apparatus and the amount (the recording density) of the ejected ink. Further, the pressing force (the nip pressure of the heat roller pair 51) of the drying driven roller 51*b* against the drying driving roller 51*a*, which is determined according to the division of the installation environment of the apparatus and the amount of the ejected ink, is represented in the control table illustrated in Table 2.

Further, in the control table represented in Table 2, the nip pressure of the heat roller pair 51 may be divided into three stages of nip pressures in which a relationship of a low pressure<a middle pressure<a high pressure is established. Of course, the control can be performed in a state in which the nip pressure can be further finely divided.

TABLE 2

| | Environment | | | | | | | | |
|---|---|---|---|---|---|---|---|---|---|
| | Section K1 | | | Section K2 | | | Section K3 | | |
| Recording density (%) | ON/OFF of heating | Number of turns of loop-like transport path | Nip pressure of heat roller pair | ON/OFF of heating | Number of turns of loop-like transport path | Nip pressure of heat roller pair | ON/OFF of heating | Number of turns of loop-like transport path | Nip pressure of heat roller pair |
| Equal to or more than 0 and less than 10 | off | 0 | High | off | 0 | High | off | 0 | High |
| Equal to or more than 10 and less than 20 | off | 0 | High | off | 0 | High | off | 0 | High |
| Equal to or more than 20 and less than 30 | on | 0 | High | off | 0 | High | off | 0 | High |
| Equal to or more than 30 and less than 40 | on | 1 | High | on | 0 | High | off | 0 | High |
| Equal to or more than 40 and less than 50 | on | 1 | Middle | on | 1 | High | on | 0 | High |
| Equal to or more than 50 and less than 60 | on | 2 | Middle | on | 1 | Middle | on | 1 | High |
| Equal to or more than 60 and less than 70 | on | 2 | Middle | on | 2 | Middle | on | 1 | Middle |
| Equal to or more than 70 and less than 80 | on | 2 | Middle | on | 2 | Middle | on | 2 | Middle |
| Equal to or more than 80 and less than 90 | on | 2 | Low | on | 2 | Middle | on | 2 | Middle |
| Equal to or more than 90 and less than 100 | on | 2 | Low | on | 2 | Low | on | 2 | Middle |
| Equal to or more than 100 | on | 2 | Low | on | 2 | Low | on | 2 | Low |

| | Environment | | | | | | | | |
|---|---|---|---|---|---|---|---|---|---|
| | Section K4 | | | Section K5 | | | Section K6 | | |
| Recording density (%) | ON/OFF of heating | Number of turns of loop-like transport path | Nip pressure of heat roller pair | ON/OFF of heating | Number of turns of loop-like transport path | Nip pressure of heat roller pair | ON/OFF of heating | Number of turns of loop-like transport path | Nip pressure of heat roller pair |
| Equal to or more than 0 and less than 10 | off | 0 | High | off | 0 | High | off | 0 | High |
| Equal to or more than 10 and less than 20 | off | 0 | High | off | 0 | High | off | 0 | High |
| Equal to or more than 20 and less than 30 | off | 0 | High | off | 0 | High | off | 0 | High |
| Equal to or more than 30 and less than 40 | on | 0 | High | off | 0 | High | off | 0 | High |
| Equal to or more than 40 and less than 50 | on | 1 | High | on | 0 | High | off | 0 | High |
| Equal to or more than 50 and less than 60 | on | 1 | Middle | on | 1 | High | on | 0 | High |
| Equal to or more than 60 and less than 70 | on | 2 | Middle | on | 1 | Middle | on | 1 | High |
| Equal to or more than 70 and less than 80 | on | 2 | Middle | on | 2 | Middle | on | 1 | Middle |
| Equal to or more than 80 and less than 90 | on | 2 | Middle | on | 2 | Middle | on | 2 | Middle |
| Equal to or more than 90 and less than 100 | on | 2 | Low | on | 2 | Middle | on | 2 | Middle |
| Equal to or more than 100 | on | 2 | Low | on | 2 | Low | on | 2 | Middle |

| | Environment | | | | | | | | |
|---|---|---|---|---|---|---|---|---|---|
| | Section K7 | | | Section K8 | | | Section K9 | | |
| Recording density (%) | ON/OFF of heating | Number of turns of loop-like transport path | Nip pressure of heat roller pair | ON/OFF of heating | Number of turns of loop-like transport path | Nip pressure of heat roller pair | ON/OFF of heating | Number of turns of loop-like transport path | Nip pressure of heat roller pair |
| Equal to or more than 0 and less than 10 | off | 0 | High | off | 0 | High | off | 0 | High |
| Equal to or more than 10 and less than 20 | off | 0 | High | off | 0 | High | off | 0 | High |
| Equal to or more than 20 and less than 30 | off | 0 | High | off | 0 | High | off | 0 | High |
| Equal to or more than 30 and less than 40 | off | 0 | High | off | 0 | High | off | 0 | High |
| Equal to or more than 40 and less than 50 | on | 0 | High | off | 0 | High | off | 0 | High |
| Equal to or more than 50 and less than 60 | on | 1 | High | on | 0 | High | off | 0 | High |

TABLE 2-continued

| | | | | | | | | | |
|---|---|---|---|---|---|---|---|---|---|
| Equal to or more than 60 and less than 70 | on | 1 | Middle | on | 1 | High | on | 0 | High |
| Equal to or more than 70 and less than 80 | on | 2 | Middle | on | 1 | Middle | on | 1 | High |
| Equal to or more than 80 and less than 90 | on | 2 | Middle | on | 2 | Middle | on | 1 | Middle |
| Equal to or more than 90 and less than 100 | on | 2 | Middle | on | 2 | Middle | on | 2 | Middle |
| Equal to or more than 100 | on | 2 | Low | on | 2 | Middle | on | 2 | Middle |

Hereinafter, the control by the control unit 25 will be described with reference to a flowchart illustrated in FIGS. 10 to 12. First, overall flow of the control of the heat roller pair 51 performed by the control unit 25 will be described with reference to FIG. 10.

When an instruction of executing recording on the medium is input to the recording unit 2, the control unit 25 acquires recording data (step S1). Next, the control unit 25 executes a control parameter setting sequence as illustrated in FIG. 11 (step S2). Hereinafter, flow of the control parameter setting sequence illustrated in FIG. 10 will be described with reference to FIG. 11.

When the control parameter setting sequence starts, the control unit 25 acquires temperature information and humidity information in step S11. In step S12, the recording density of the medium is calculated based on the recording data acquired in step S1 of the flowchart illustrated in FIG. 10. Next, in step S13, the ON state and the OFF state of the heating by the heat roller pair 51 and the nip pressure of the heat roller pair 51 as a control parameter are acquired from the control table represented in Table 2, using the temperature information and the humidity information acquired in step S11 and the recording density calculated in step S12.

In step S14, the ON state or the OFF state of the heating by the heat roller pair 51 is set based on the control parameter acquired in step S13. When the heating by the heat roller pair 51 is turned on, the process proceeds to step S15. The heat roller pair 51 is heated to increase the temperature of the heat roller pair 51 to a predetermined temperature. Next, the process proceeds to step S16. In step S14, when the heating by the heat roller pair 51 is turned off, the process proceeds to step S16 as it is.

In step S16, the nip pressure of the heat roller pair 51 is set based on the control parameter acquired in step S13. In the present embodiment, as described above, the nip pressure of the heat roller pair 51 can be set to any one of the three stages of the nip pressures in which the relationship of a low pressure<a middle pressure<a high pressure is established. In step S17, the nip pressure of the heat roller pair 51 is set to the low pressure. In step S18, the nip pressure of the heat roller pair 51 is set to the middle pressure. In step S19, the nip pressure of the heat roller pair 51 is set to the high pressure.

Figure 10:
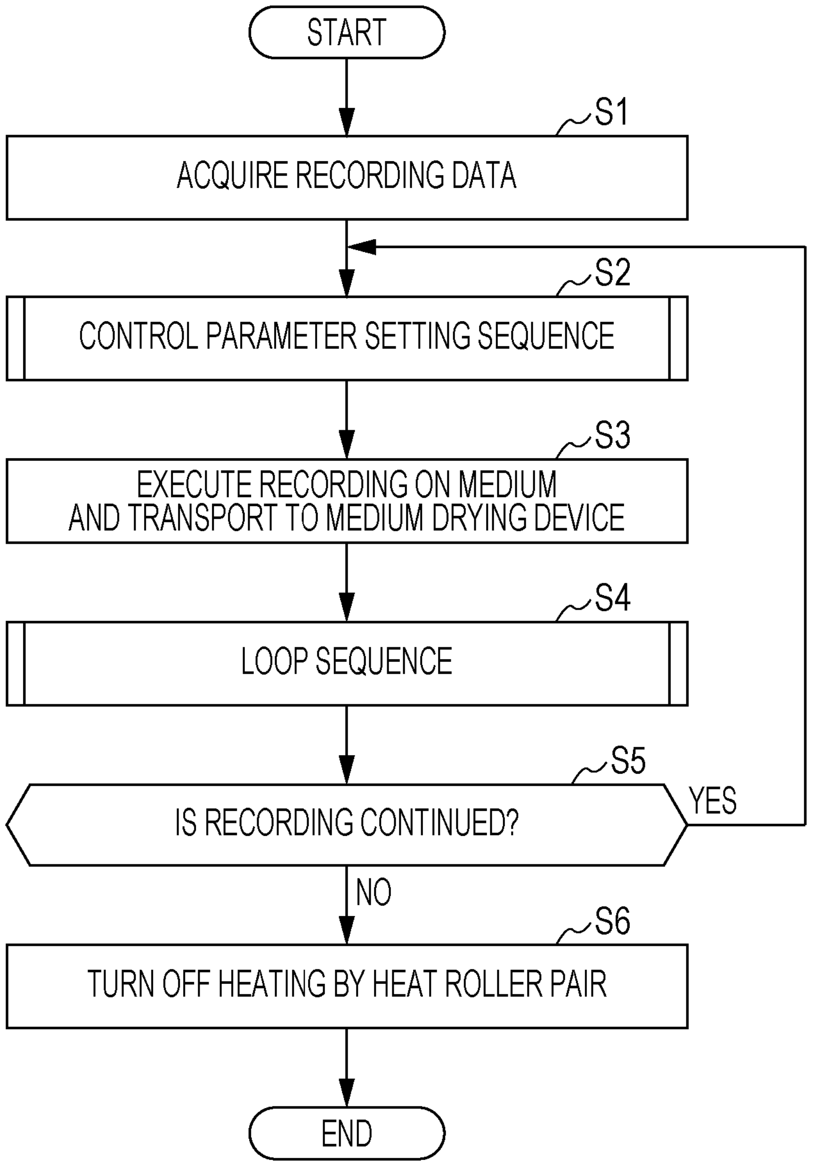
FIG. 10 is a flowchart for illustrating control of the heat roller pair by a control unit.
Figure 11:
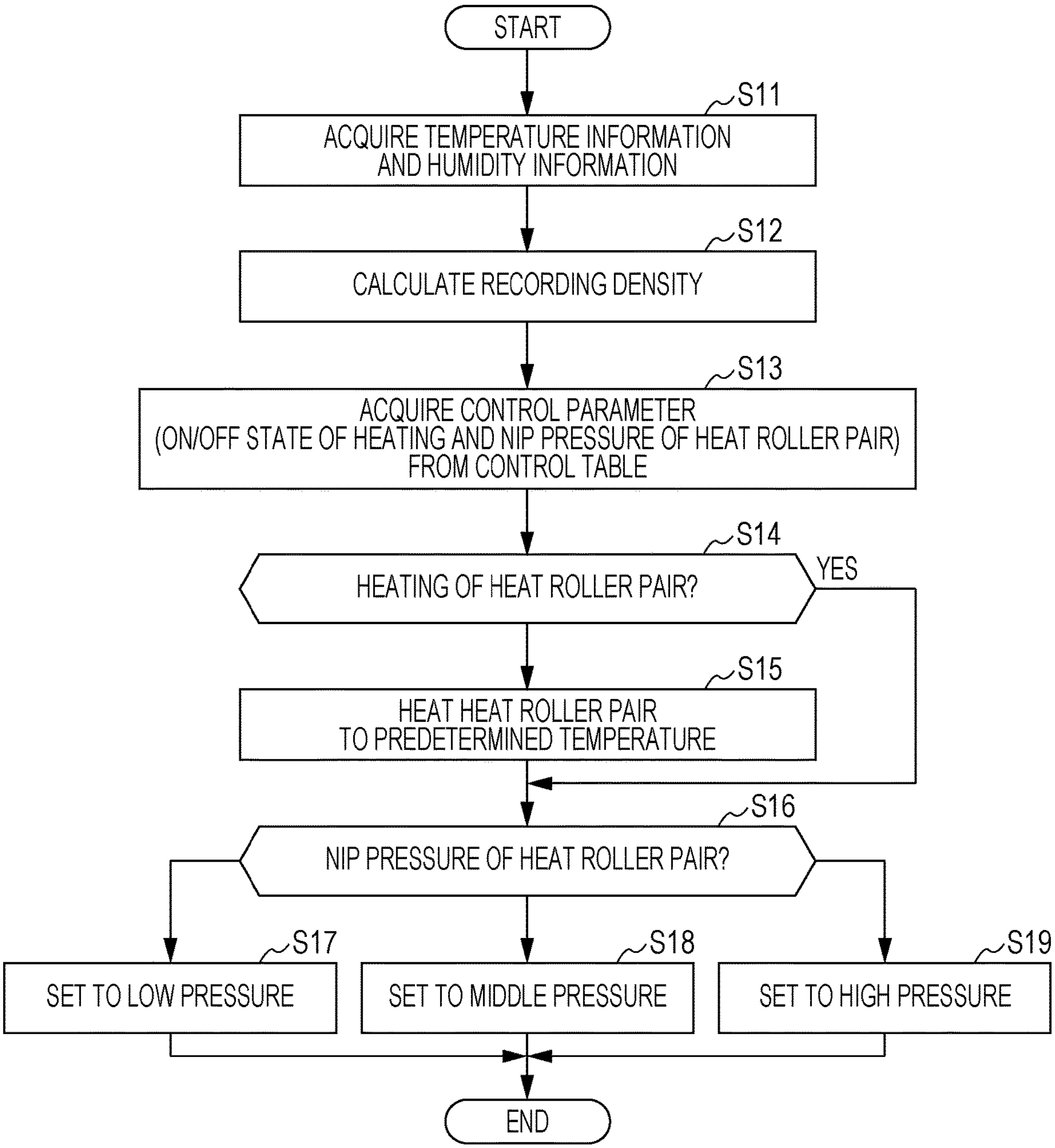
FIG. 11 is a flowchart for illustrating a control parameter setting sequence of the flowchart illustrated in FIG. 10.

Returning to the flowchart illustrated in FIG. 10, after the control parameter setting sequence is executed in step S2, the control unit 25 executes the recording on the medium by the recording unit 2, and transports the medium to the medium drying device 50 (step S3).

Figure 12:
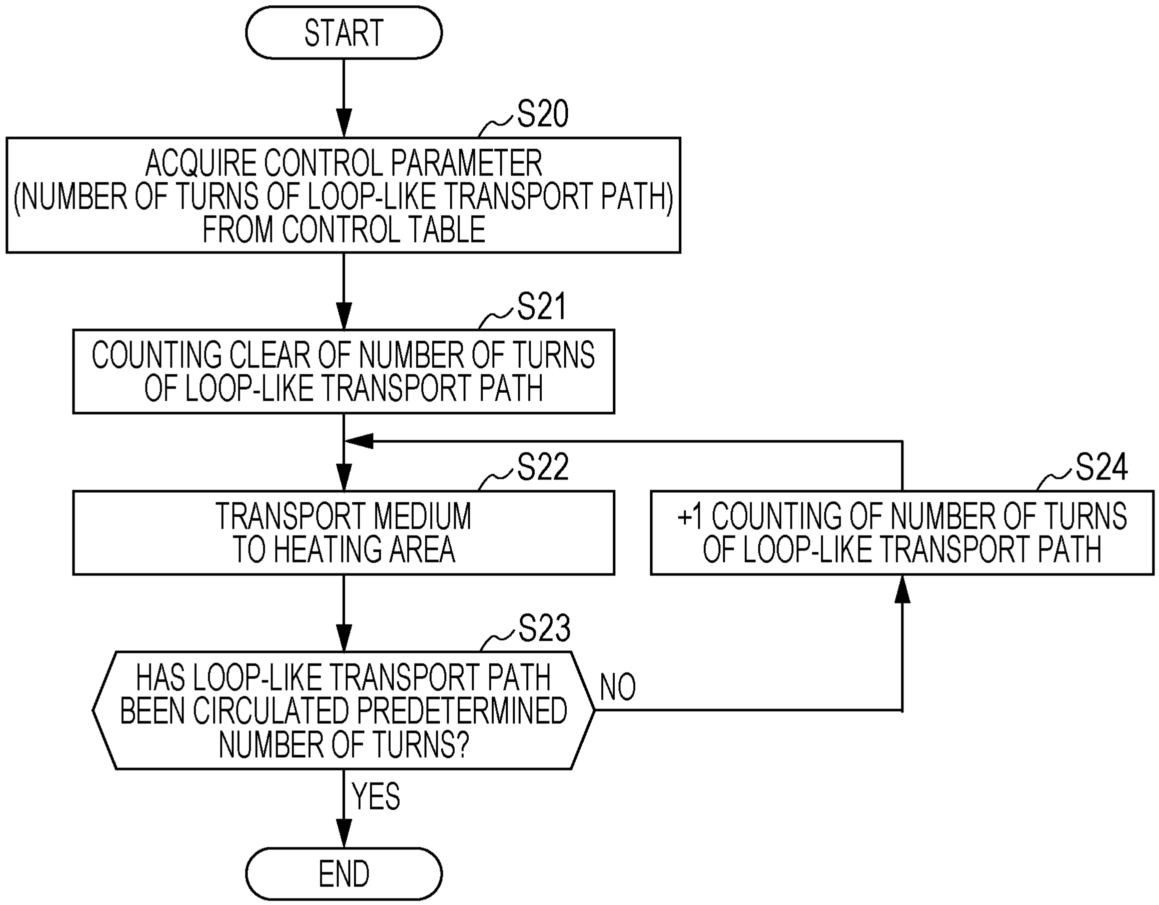
FIG. 12 is a flowchart for illustrating a loop sequence of the flowchart illustrated in FIG. 10.

Next, the control unit 25 executes a loop sequence as illustrated in FIG. 12 (step S4). Hereinafter, flow of the loop sequence illustrated in FIG. 10 will be described with reference to FIG. 12.

When the loop sequence starts, the control unit 25 acquires the number of turns of the loop-like transport path 52 as the control parameter from the control table illustrated in Table 2, using the temperature information and the humidity information acquired in the above-described control parameter setting sequence and the calculated recording density (step S20). Next, counting of the number of turns of the loop-like transport path 52 is cleared (step S21), and the medium is transported to the heating area H of the heat roller pair 51 (step S22). When the medium is transported to the heating area H, it is determined whether or not the medium circulates in the loop-like transport path 52 by the number of turns acquired in step S20 (step S23). When it is determined in step S23 that the condition is not satisfied, the process proceeds to step S24, the counting of the number of turns of the loop-like transport path 52 is increased by one, and the process returns to step S22. When it is determined in step S23 that the condition is satisfied, the loop sequence is terminated.

Returning to the flowchart illustrated in FIG. 10, after the loop sequence is executed in step S4, it is determined whether or not the recording by the recording unit 2 is continued (step S5). When it is determined in step S5 that the condition is satisfied, that is, when the recording by the recording unit 2 is continued, the process returns to step S2, and steps S2 to S4 are performed on a next medium. When it is determined in step S5 that the condition is not satisfied, the heating by the heat roller pair 51 is turned off, and the process is terminated.

As described above, the control unit 25 can control the heating of the medium by the heat roller pairs 51 according to the conditions, to appropriately dry the medium.

Further, the control table may be changed according to, for example, the type, the rigidity, the thickness, and the basis weight of the medium. Further, the control unit 25 can control, for example, whether or not residual heat of the heat roller pair 51 is performed, a timing when the residual heat starts when the residual heat is performed, a timing when the temperature is increased to a drying temperature from a residual heat state, and the like, in addition to the ON state or the OFF state of the heating by the heat roller pair 51 described above, the heating temperature during the heating, the number of times by which the medium passes through the heating area H, and the nip pressure of the heat roller pair 51.

In the present embodiment, the entire recording system 1 is controlled by the control unit 25 provided in the recording unit 2. However, for example, a control unit that controls operations of various components of the first unit 5 as the medium processing apparatus may be provided in the first unit 5.

Further, in the present embodiment, an apparatus in which a recording function is omitted from the recording system 1 may be regarded as a medium processing apparatus.

In Second Unit

Next, the second unit 6 as a saddle stitching unit will be described with reference to FIG. 1.

The second unit 6 is provided outside an apparatus body of the first unit 5, receives the medium discharged from the first discharge section 61, and performs the saddle stitching processing of stitching a central portion of the medium discharge direction (the +Y direction).

The medium delivered from the first discharge section 61 of the first unit 5 is transported through a transport path 69 illustrated by a solid line of FIG. 1, and is sent to the saddle stitching processing unit 70. The saddle stitching processing unit 70 can perform the saddle stitching processing of stitching a bundle M of media, folding the bundle M of the media at a stitching position, and then bringing the bundle M of the media into a booklet. The saddle stitching processing by the saddle stitching processing unit 70 will be described in detail below.

The bundle M of the media after the saddle stitching processing by the saddle stitching processing unit 70 is discharged to a second tray 65 illustrated in FIG. 1. The second tray 65 includes a regulation unit 66 at a tip end in the +Y direction that is the medium discharge direction, and it is suppressed that the bundle M of the media discharged to the second tray 65 protrudes from the second tray 65 in the medium discharge direction or falls from the second tray 65. Reference numeral 67 denotes a guide portion 67 that guides, to the second tray 65, the bundle M of the media discharged from the second unit 6.

In the present embodiment, the second unit 6 is configured to be detachable below a first tray 40 provided in the first unit 5.

With this configuration, it is possible to easily switch between a configuration having the second unit 6 and a configuration without the second unit 6 in the recording system 1 or the first unit 5 as the medium processing apparatus. Further, when the second unit 6 is mounted, the second unit 6 is located below the first tray 40. Thus, removal of the medium discharged to the first tray 40 by the second unit 6 cannot be prevented.

Next, a configuration around the saddle stitching processing unit 70 will be described with reference to FIGS. 1 and 13. The second unit 6 illustrated in FIG. 1 is provided with a feeding roller pair 75 as a feeding unit provided in the transport path 69 to transport the medium P, a stacking unit 71 on which the medium P is stacked, and the saddle stitching processing unit 70 that performs the saddle stitching processing on the medium stacked on the stacking unit 71. The saddle stitching processing unit 70 includes a stitching unit 72 that stitches the bundle M of the media including a plurality of sheets of media P stacked on the stacking unit 71 at the stitching position and a folding roller pair 73 as a folding unit that folds the bundle M of the media at the stitching position.

Figure 13:
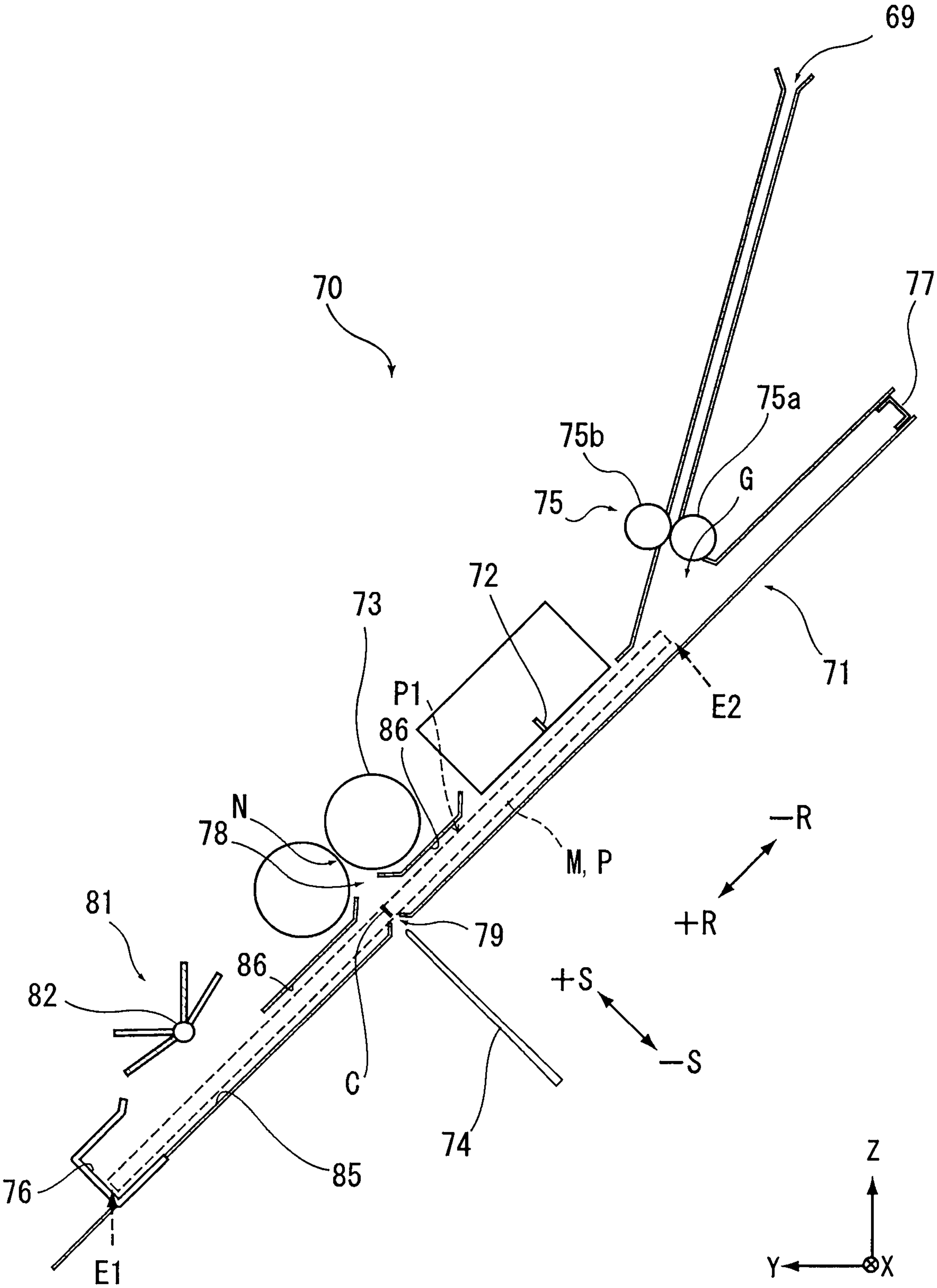
FIG. 13 is a side sectional view illustrating a saddle stitching processing unit.

As illustrated in FIG. 13, the stacking unit 71 includes an alignment unit 76 that aligns a downstream end E1 of the stacked medium P and a paddle 81. The feeding roller pair 75 includes a driving roller 75*a* driven by a driving source which is not illustrated and a driven roller 75*b* driven to rotate by rotation of the driving roller 75*a*. The driving roller 75*a* is controlled by the control unit 25 to rotate.

In FIG. 13, the stacking unit 71 receives and stacks the medium P transported by the feeding roller pair 75, between a support surface 85 that supports the medium P in an inclined posture in which a downstream side of a transport direction +R faces the lower side and an opposite surface 86 opposite to the support surface 85. The paddle 81 is provided between the feeding roller pair 75 and the alignment unit 76 in the transport direction +R and is rotated about a rotary shaft 82 while contacting the medium P to move the medium P to the alignment unit 76.

In FIG. 13, reference sign G indicates a junction position G where the transport path 69 and the stacking unit 71 are joined to each other. Further, in the present embodiment, the stitching position is a central portion C of the medium P stacked on the stacking unit 71 in the transport direction +R. The medium P is sent from the transport path 69 to the stacking unit 71 by the feeding roller pair 75.

The stacking unit 71 is provided with the alignment unit 76 that can come into contact with a downstream end E1 of the medium P stacked on the stacking unit 71 in the transport direction +R and an abutting unit 77 that can come into contact with a downstream end E2 of the medium P stacked on the stacking unit 71 in the transport direction +R.

The alignment unit 76 and the abutting unit 77 are configured to be movable in both the transport direction +R of the medium P and an opposite direction −R thereto in the stacking unit 71 illustrated in FIG. 13. The alignment unit 76 and the abutting unit 77 can be moved in the transport direction +R or the opposite direction −R using, for example, a rack and pinion mechanism, a belt moving mechanism, or the like operated by power of a driving source which is not illustrated. The movement of the alignment unit 76 and the abutting unit 77 will be described in detail when a stacking operation of the stacking unit 71 is described.

The stitching unit 72 that stitches the bundle M of the media stacked on the stacking unit 71 at a predetermined position in the transport direction +R is provided downstream of the junction position G. The stitching unit 72 is a stapler as an example. A plurality of the stitching units 72 are provided at intervals in the X axis direction that is the width direction of the medium. As described above, the stitching unit 72 is configured to stitch the bundle M of the media with a central portion C of the bundle M of the media as the stitching position in the transport direction +R.

In FIG. 13, the folding roller pair 73 is provided downstream of the stitching unit 72. The opposite surface 86 is open at a position corresponding to a nip position N of the folding roller pair 73, and an approach path 78 of the bundle M of the media is formed from the stacking unit 71 to the folding roller pair 73. A slope that guides the central portion C that is the stitching position from the stacking unit 71 to the nip position N is formed at an entrance of the approach path 78 of the opposite surface 86.

Figure 15:
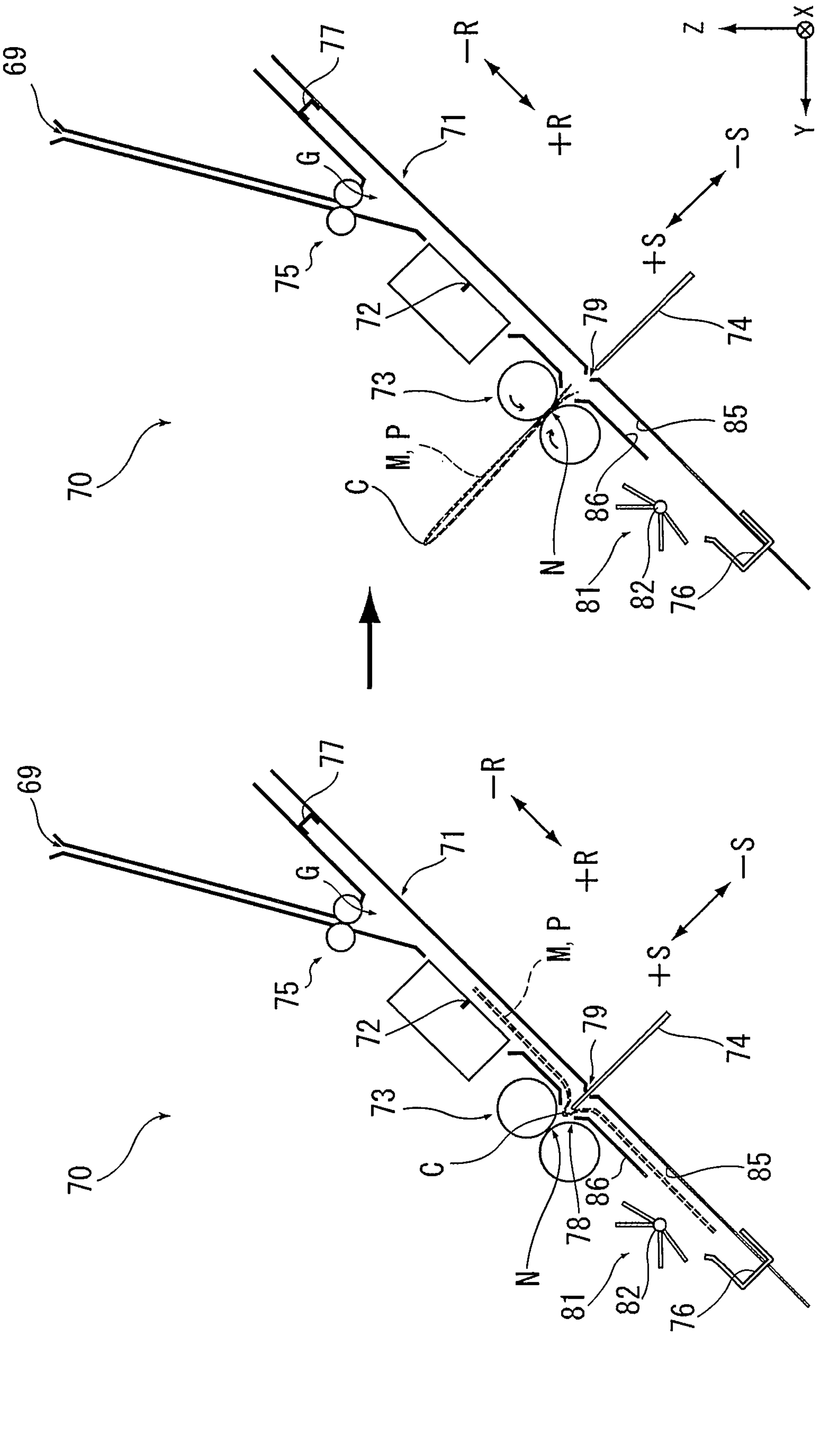
FIG. 15 is a diagram illustrating the saddle stitching processing in the saddle stitching processing unit.

A blade 74, which can switch between a retracted state in which the blade 74 is retracted from the stacking unit 71 as illustrated in FIG. 13 and an advanced state in which the blade 74 is advanced with respect to the stitching position of the bundle M of the media stacked on the stacking unit 71 as illustrated in a left view of FIG. 15, is provided on an opposite side to the folding roller pair 73 with the stacking unit 71 interposed therebetween. Reference numeral 79 is a hole 79 provided on the support surface 85, and the blade 74 can pass through the hole 79.

In Transport of Medium During Saddle Stitching Processing

Next, a basic flow in which in the second unit 6, the medium P is transported, is saddle-stitching-processed, and is discharged will be described with reference to FIGS. 13 to 15.

In FIG. 13, the medium P transported to the stacking unit 71 moves toward the alignment unit 76 by a self-weight thereof, and the paddle 81 is rotated whenever the one medium P is transported, so that the medium P is abutted against the alignment unit 76.

FIG. 13 shows a state in which a plurality of the media P stacked on the stacking unit 71 are stacked as the bundle M of the media.

Further, when the medium is received in the stacking unit 71, as illustrated in FIG. 13, the alignment unit 76 is disposed such that a distance from the junction position G between the transport path 69 and the stacking unit 71 to the alignment unit 76 is longer than the length of the medium P. Accordingly, the upstream end E2 of the medium P transported from the transport path 69 does not remain in the transport path 69, and the medium P is received by the stacking unit 71. The position of the alignment unit 76 in the transport direction +R of the stacking unit 71 may be changed according to the size of the medium P.

When a predetermined number of media P are stacked on the stacking unit 71, the stitching processing is performed in which the central portion C of the bundle M of the media in the transport direction +R is stitched by the stitching unit 72. At a time point when the transport of the medium P from the transport path 69 to the stacking unit 71, as illustrated in FIG. 13, since the central portion C deviates from the position of the stitching unit 72, the alignment unit 76 is moved in the −R direction as illustrated in a left view of FIG. 14, so that the central portion C of the bundle M of the media is disposed at a position facing the stitching unit 72. Further, the abutting unit 77 is moved in the +R direction to come into contact with the upstream end E2 of the bundle M of the media. The downstream end E1 and the upstream end E2 of the bundle M of the media are aligned by the alignment unit 76 and the abutting unit 77, so that the central portion C of the bundle M of the media is stitched by the stitching unit 72.

Figure 14:
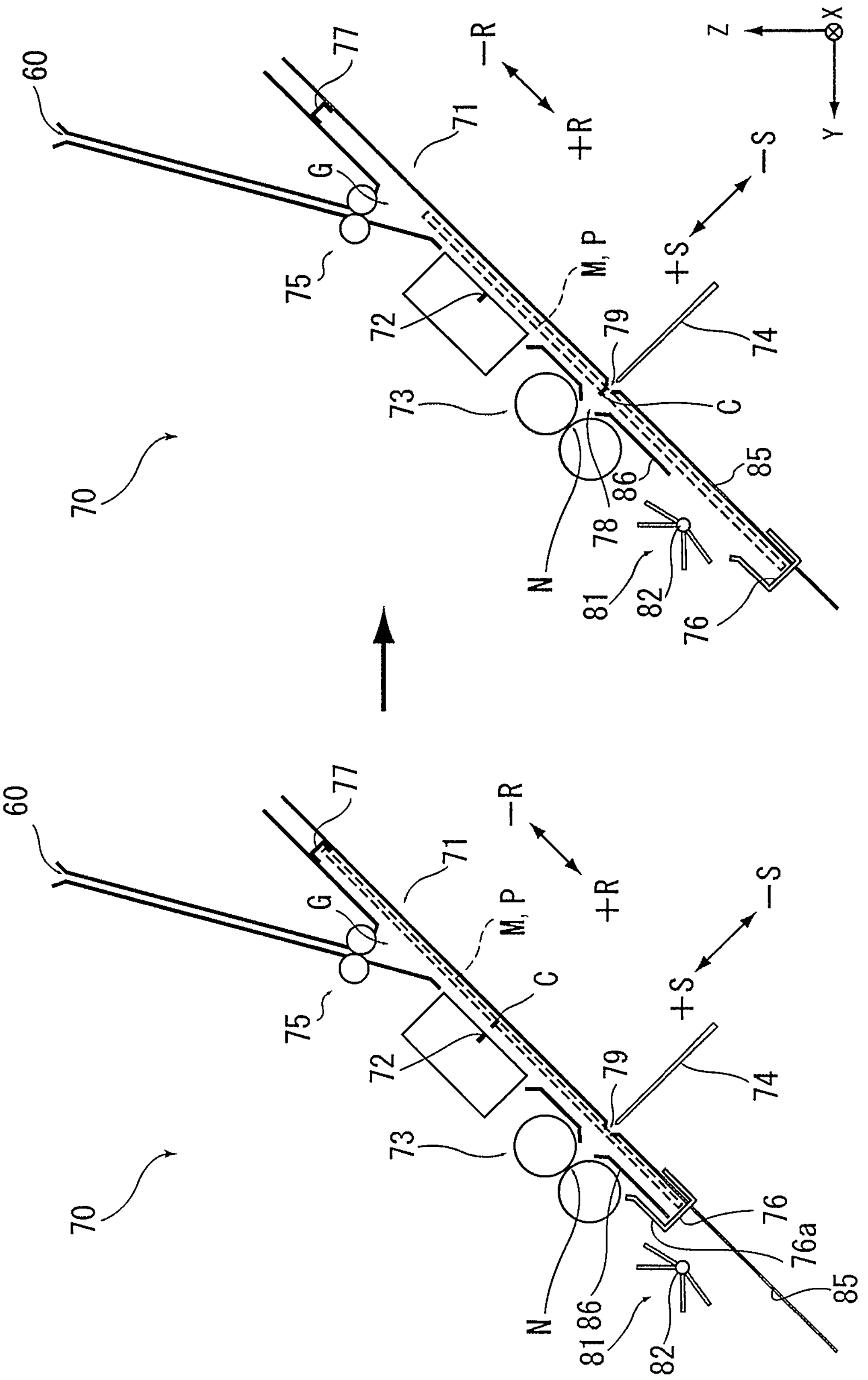
FIG. 14 is a diagram illustrating saddle stitching processing in the saddle stitching processing unit.

When the bundle M of the media is stitched by the stitching unit 72, as illustrated in a right view of FIG. 14, the alignment unit 76 is moved in the +R direction, and the bundle M of the media is moved such that the stitched central portion C is disposed at a position facing the nip position N of the folding roller pair 73. While a state in which the bundle M of the media is in contact with the alignment unit 76 is maintained by a self-weight thereof, only the alignment unit 76 is moved in the +R direction, so that the bundle M of the media can be moved in the +R direction. Further, the abutting unit 77 may be moved in the +R direction to maintain a state in which the abutting unit 77 is in contact with the upstream end E2 of the bundle M of the media.

Next, when the central portion C of the bundle M of the media is disposed at a position facing the nip position N of the folding roller pair 73, as illustrated in a left view of FIG. 15, the blade 74 is advanced in a +S direction to bend the central portion C toward the folding roller pair 73. The bent central portion C of the bundle M of the media is moved toward the nip position N of the folding roller pair 73 through the approach path 78.

When the central portion C of the bundle M of the media is nipped by the folding roller pair 73, the folding roller pair 73 is rotated. As illustrated in a right view of FIG. 15, the bundle M of the media is discharged toward the second tray 65 (FIG. 1) while being folded at the central portion C by the nip pressure of the folding roller pair 73.

Further, after the central portion C is nipped by the folding roller pair 73, the alignment unit 76 is moved in the +R direction, returns to the state of FIG. 10, and prepares for reception of a next medium P in the stacking unit 71.

Further, the transport path 69 may be provided with a folding stripe forming unit that attaches a folding stripe to the central portion C of the medium P. By attaching the folding stripe to the central portion C that is a folding position by the folding roller pair 73, the bundle M of the media can be easily folded at the central portion C.

Second Embodiment

A second embodiment will be described with reference to FIG. 16. Further, in the following embodiments, the same components as those of the first embodiment are denoted by the same reference numerals, and description of the components will be omitted.

The medium drying device 50A according to the second embodiment does not have the loop-like transport path 52 described in the first embodiment.

The medium drying device 50A is configured to transport the medium P to the heating area H in both a first transport direction and a second transport direction that is opposite to the first transport direction. In FIG. 1, the first transport direction is set as the +Y direction, and the second transport direction is set as the −Y direction.

In the heat roller pair 51, the drying driving roller 51*a* is configured to be rotatable in both a first rotation direction +K in which the medium P is transported in the first transport direction +Y and a second rotation direction −K in which the medium P is transported in the second transport direction −Y. Then, by transporting the medium P in the first transport direction +Y or the second transport direction −Y, the medium can pass through the heating area H a plurality of times.

The medium drying device 50A includes a first straight path 101 extending downstream of the first transport direction +Y with respect to the heat roller pair 51 and a second straight path 102 extending upstream of the first transport direction +Y with respect to the heat roller pair 51.

The second transport path 44 (see also FIG. 1) is joined to the second straight path 102, and the medium P is sent to the heat roller pair 51 by the transport roller pair 68 provided in the second transport path 44.

A third switching flap 103 is provided at a junction position of the second transport path 44 to the second straight path 102. The third switching flap 103 includes a third shaft portion 103*a* and is configured to be pivotable about the third shaft portion 103*a*. When the medium P enters the second straight path 102 from the second transport path 44, the third switching flap 103 opens a junction position of the second transport path 44 to the second straight path 102, as illustrated by a solid line of FIG. 16. When the medium P is reciprocally transported in the first transport direction +Y or the second transport direction −Y by the heat roller pair 51 to order to dry the medium P, the third switching flap 103 opens the junction position of the second transport path 44 to the second straight path 102, as illustrated by one dot chain line of FIG. 16. With this configuration, the medium can be smoothly transported to the heating area H a plurality of times.

The first straight path 101 is a path coupled to the first discharge section 61 (see also FIG. 1) in the first unit 5. In the first straight path 101, the fourth transport path 59 that returns the medium drying-processed by the heat roller pair 51 to the first transport path 43 (FIG. 1) is provided to be branched downstream of the heat roller pair 51 in the first transport direction +Y.

In the first straight path 101, a fourth switching flap 104 is provided at a branching position of the fourth transport path 59. The fourth switching flap 104 includes a fourth shaft portion 104*a*, and is configured to be swingable about the fourth shaft portion 104*a*. When the drying processing is performed by the heat roller pair 51 or when the medium P drying-processed by the heat roller pair 51 is sent to the first discharge section 61, the fourth switching flap 104 swings as illustrated by a solid line of FIG. 16, so that the fourth transport path 59 is closed and the first straight path 101 is opened.

Figure 16:
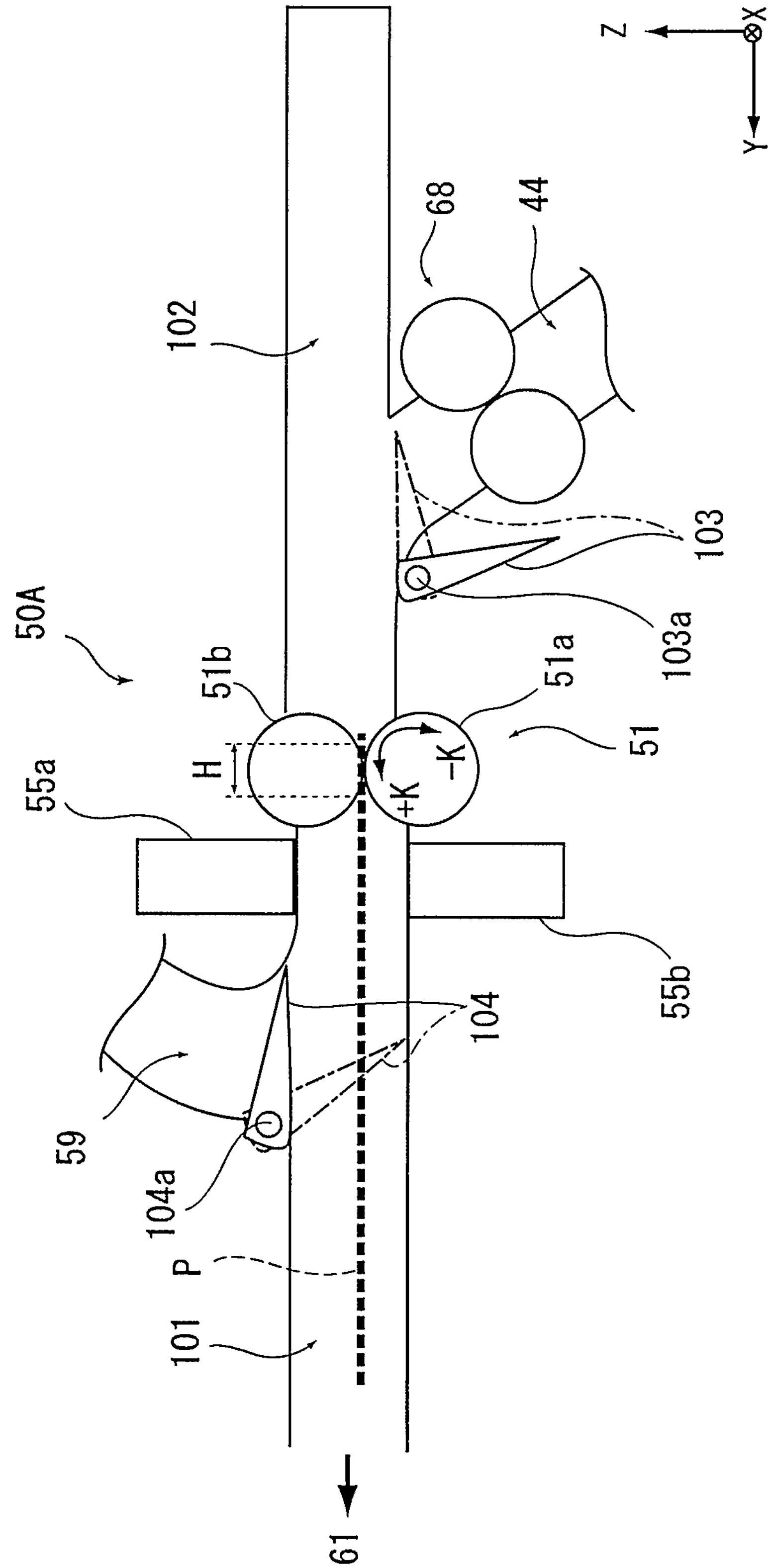
FIG. 16 is a schematic view illustrating a medium drying device according to a second embodiment.

When the medium P, which has been drying-processed by the heat roller pair 51, is sent to the fourth transport path 59, the fourth switching flap 104 swings as illustrated by one dot chain line of FIG. 16, so that the first straight path 101 is closed and the fourth transport path 59 is opened. With this configuration, a transport destination of the medium P can be switched.

With this configuration, the medium P is sent to the heating area H a plurality of times, so that the medium P can be drying-processed a plurality of times. Thus, the medium P can be more reliably dried.

Further, for example, the medium P is transported to a rear end in the first transport direction +Y by the heat roller pair 51, the heat roller pair 51 is reversely rotated while a rear end of the medium P in the first transport direction +Y is nipped by the heat roller pair 51, and the medium P is transported in the second transport direction −Y, so that the medium P can reciprocate with respect to the heating area H.

Further, the first straight path 101 and the second straight path 102 are provided with another transport unit that can transport the medium P in both the first transport direction +Y and the second transport direction −Y. When the medium transport direction is switched, the rear end of the medium P in the latest medium transport direction may be temporarily separated from the nipping by the heat roller pair 51.

Further, in the present embodiment, the first duct 55*a* and the second duct 55*b* as exhaust units are provided downstream of the heat roller pair 51 in the first transport direction +Y. However, the exhaust units may be provided upstream of the heat roller pair 51 in the first transport direction +Y, that is, downstream of the heat roller pair 51 in the second transport direction −Y.

Third Embodiment

A third embodiment will be described with reference to FIG. 17.

Figure 17:
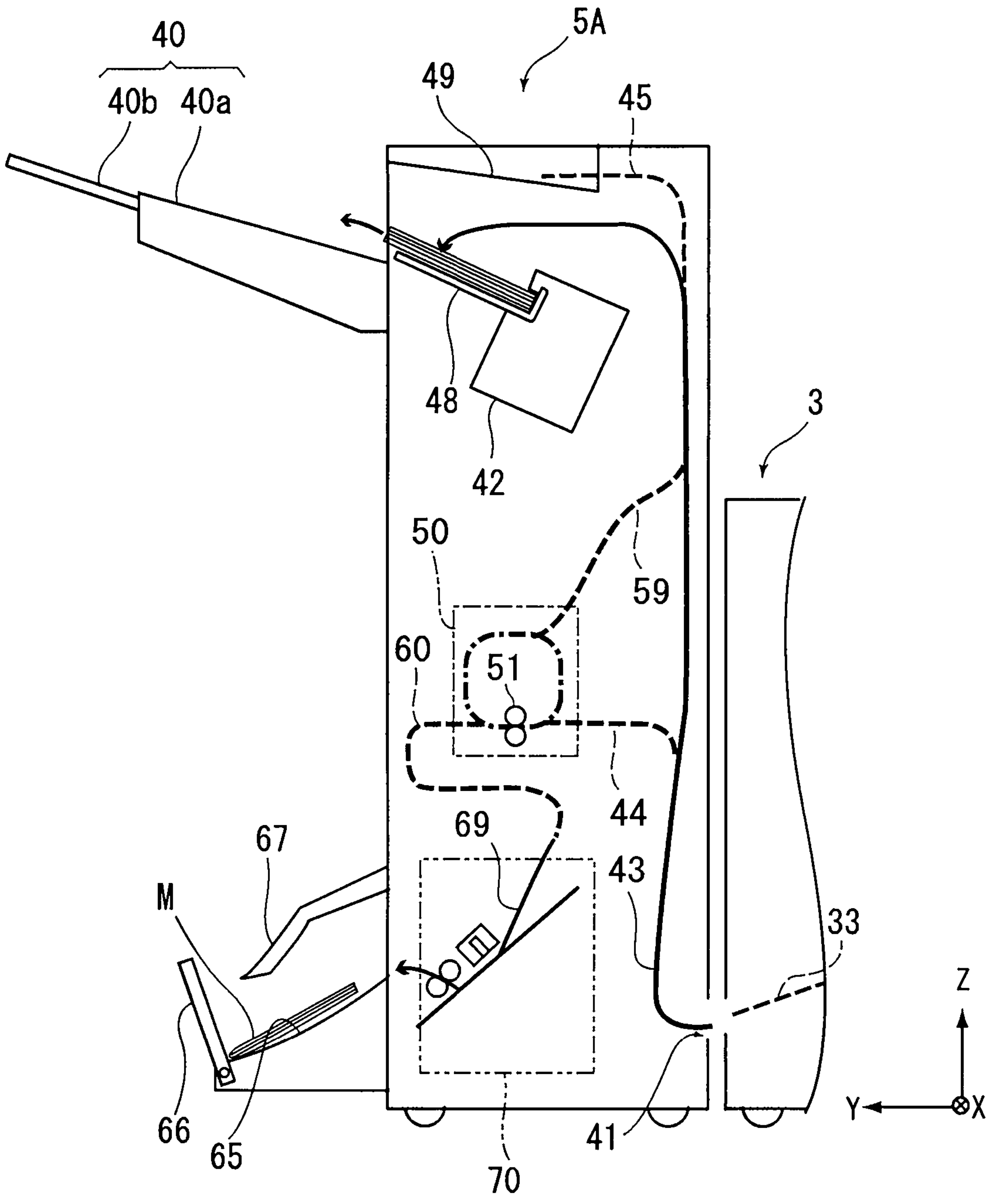
FIG. 17 is a schematic view illustrating a first unit according to a third embodiment.

The first unit 5A illustrated in FIG. 17 as the medium processing apparatus according to the third embodiment includes the medium drying device 50, the end stitching unit 42, and the saddle stitching processing unit 70, which have been described in the first embodiment, in one unit.

As illustrated in FIG. 17, in the first unit 5A, the saddle stitching processing unit 70 is positioned in the −Z direction that is a vertically downward direction of the medium drying device 50, that is, the end stitching unit 42, the medium drying device 50, and the saddle stitching processing unit 70 are arranged in the order thereof from the upper side. Further, although illustration is omitted, the end stitching unit 42, the medium drying device 50, and the saddle stitching processing unit 70 partially overlap each other even in the X axis direction. The medium drying device 50, the end stitching unit 42, and the saddle stitching processing unit 70 are arranged to have overlapping portions when viewed from a vertical direction, that is, when viewed from the upper side. Further, only the medium drying device 50 and the saddle stitching processing unit 70 may overlap each other or only the end stitching unit 42 and the saddle stitching processing unit 70 may overlap each other.

As the end stitching unit 42, the medium drying device 50, and the saddle stitching processing unit 70 are arranged in one unit, while an increase in the horizontal dimension of the apparatus is suppressed and the apparatus is miniaturized, all of the drying processing, the end stitching processing, and the saddle stitching processing can be performed by one apparatus.

Figure 18:
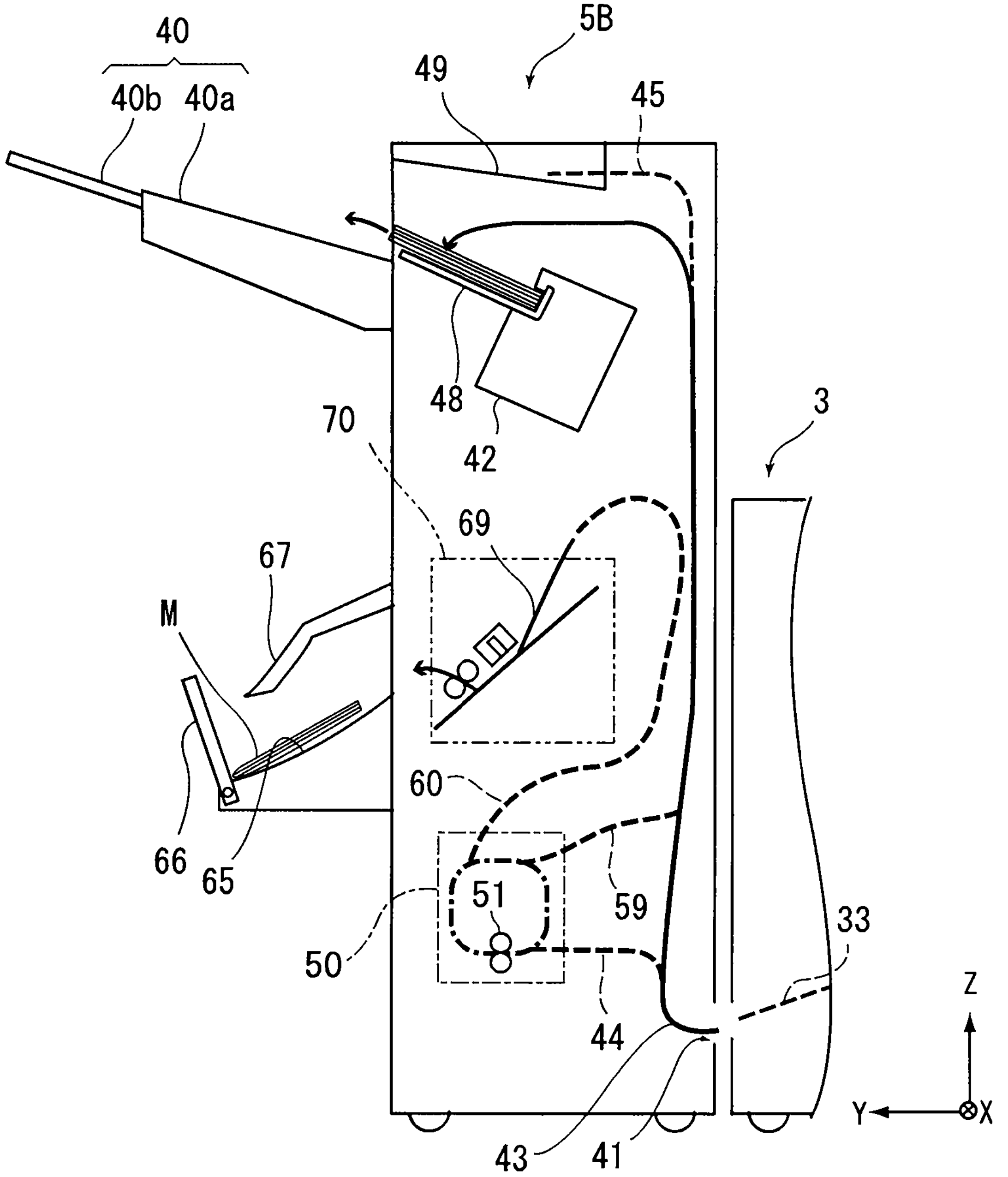
FIG. 18 is a schematic view illustrating another example of the first unit according to the third embodiment.

Further, when the end stitching unit 42, the medium drying device 50, and the saddle stitching processing unit 70 are provided in one unit, not only arrangement as illustrated in FIG. 17, as in the first unit 5B illustrated in FIG. 18, the saddle stitching processing unit 70 may be located between the medium drying device 50 and the end stitching unit 42 in the vertical direction, that is, the end stitching unit 42, the saddle stitching processing unit 70, and the medium drying device 50 may be arranged in the order thereof from the upper side. Even in this case, as the medium drying device 50, the end stitching unit 42, and the saddle stitching processing unit 70 are arranged to have overlapping portions when viewed from the vertical direction, that is, when viewed from the upper side, the increase in the horizontal dimension of the apparatus can be suppressed and the apparatus can be miniaturized. Further, even in this case, only the medium drying device 50 and the saddle stitching processing unit 70 may overlap each other or only the end stitching unit 42 and the saddle stitching processing unit 70 may overlap each other.

Further, it is apparent that the present disclosure is not limited to the above-described embodiments, various modifications can be made without departing from the scope of the present disclosure described in the appended claims, and the modifications are also included in the scope of the present disclosure.

What is claimed is:

1. A medium processing apparatus comprising:
- a receiving portion that receives a medium;
- a transport path that transports the medium received from the receiving portion;
- a drying unit drying the medium received from the receiving portion; and
- a discharge portion that discharges the medium, wherein the transport path includes:
  - a first transport path that transports the medium to the discharge portion without passing through the drying unit or any other drying unit, and
  - a second transport path that transports the medium to the discharge portion through the drying unit.

2. The medium processing apparatus according to claim 1, wherein
- the second transport path includes
- a third transport path that branches from the first transport path and transports the medium to the drying unit and a fourth transport path that is joined to the first transport path from the drying unit.

3. The medium processing apparatus according to claim 1, wherein
- the drying unit includes
- a transport unit that transports a medium and
- one heating unit that heats the medium transported by the transport unit and is provided in a transport direction of the medium, and the medium is transported to a heating area by the heating unit a plurality of times.

4. The medium processing apparatus according to claim 3, wherein
- the transport unit has a loop-like transport path including the heating area and configured to circumferentially transport the medium, and
- as the medium passes through the loop-like transport path, the medium passes through the heating area a plurality of times.

5. The medium processing apparatus according to claim 3, wherein
- the heating unit includes a heating roller pair that holds the medium between a driving roller driven to rotate and a driven roller driven to rotate by the rotation of the driving roller and transports the medium, and one or both of the driving roller and the driven roller is heated.

6. The medium processing apparatus according to claim 1, further comprising:

a processing unit that performs processing on the medium received from the reception unit or the medium drying-processed by the drying unit, wherein the discharge portion discharges the medium not performed processing having been processed by the processing unit.

7. The medium processing apparatus according to claim 1, further comprising:

a processing unit that performs processing on the medium received from the reception unit or the medium drying-processed by the drying unit, wherein the discharge portion discharges the medium performed processing having been processed by the processing unit.

8. A recording system comprising:

a recording unit performing recording on a medium;

a transport path that transports the medium performed recording by the recording unit;

a drying unit drying the medium performed recording by the recording unit; and a discharge portion that discharges the medium, wherein the transport path includes:

a first transport path that transports the medium to the discharge portion without passing through the drying unit or any other drying unit, and a second transport path that transports the medium to the discharge portion through the drying unit.

9. The medium processing apparatus according to claim 3, wherein the transport unit has a loop-like transport path configured to circumferentially transport the medium, the heating unit includes a heating roller pair that holds the medium between a driving roller driven to rotate and a driven roller driven to rotate by the rotation of the driving roller and transports the medium, and one or both of the driving roller and the driven roller is heated, the heating roller pair is disposed at a part of the loop-like transport path, and as the medium passes through the loop-like transport path, the medium passes through the heating roller pair a plurality of times.

10. The medium processing apparatus according to claim 1, wherein the discharge portion is a first discharge portion, the medium processing apparatus further comprising:

a second discharge portion that discharges the medium, wherein the first transport path transports the medium to either the first discharge portion or the second discharge portion without passing through the drying unit, and wherein the second transport path transports the medium to either the first discharge portion or the second discharge portion through the drying unit.

11. The medium processing apparatus according to claim 1, wherein the discharge portion is a first discharge portion, the medium processing apparatus further comprising:

a second discharge portion that discharges the medium;

a third transport path that branches from the first transport path and goes to the first discharge portion; and a fourth transport path that branches from the first transport path and goes to the second discharge portion.

12. The recording system according to claim 8, wherein the second transport path includes a third transport path that branches from the first transport path and transports the medium to the drying unit and a fourth transport path that is joined to the first transport path from the drying unit.

13. The recording system according to claim 8, wherein the drying unit includes a transport unit that transports a medium and one heating unit that heats the medium transported by the transport unit and is provided in a transport direction of the medium, and the medium is transported to a heating area by the heating unit a plurality of times.

14. The recording system according to claim 13, wherein the transport unit has a loop-like transport path including the heating area and configured to circumferentially transport the medium, and as the medium passes through the loop-like transport path, the medium passes through the heating area a plurality of times.

15. The recording system according to claim 13, wherein the heating unit includes a heating roller pair that holds the medium between a driving roller driven to rotate and a driven roller driven to rotate by the rotation of the driving roller and transports the medium, and one or both of the driving roller and the driven roller is heated.

16. The recording system according to claim 8, further comprising:

a processing unit that performs processing on the medium performed recording by the recording unit or the medium drying-processed by the drying unit, wherein the discharge portion discharges the medium not performed processing having been processed by the processing unit.

17. The recording system according to claim 8, further comprising:

a processing unit that performs processing on the medium performed recording by the recording unit or the medium drying-processed by the drying unit, wherein the discharge portion discharges the medium performed processing having been processed by the processing unit.

18. The medium processing apparatus according to claim 13, wherein the transport unit has a loop-like transport path configured to circumferentially transport the medium, the heating unit includes a heating roller pair that holds the medium between a driving roller driven to rotate and a driven roller driven to rotate by the rotation of the driving roller and transports the medium, and one or both of the driving roller and the driven roller is heated, the heating roller pair is disposed at a part of the loop-like transport path, and as the medium passes through the loop-like transport path, the medium passes through the heating roller pair a plurality of times.

19. The recording system according to claim 8, wherein the discharge portion is a first discharge portion, the recording system further comprising:

a second discharge portion that discharges the medium, wherein the first transport path transports the medium to either the first discharge portion or the second discharge portion without passing through the drying unit, and wherein the second transport path transports the medium to either the first discharge portion or the second discharge portion through the drying unit.

20. The recording system according to claim 8, wherein the discharge portion is a first discharge portion, the recording system further comprising:

a second discharge portion that discharges the medium;

a third transport path that branches from the first transport path and goes to the first discharge portion; and a fourth transport path that branches from the first transport path and goes to the second discharge portion.

* * * * *